(12) United States Patent
Simplicio, Jr. et al.

(10) Patent No.: US 11,606,216 B2
(45) Date of Patent: Mar. 14, 2023

(54) CRYPTOGRAPHIC METHODS AND SYSTEMS FOR MANAGING DIGITAL CERTIFICATES WITH LINKAGE VALUES

(71) Applicants: LG Electronics, Inc., Seoul (KR); UNIVERSITY OF SAO PAULO, Sao Paulo (BR)

(72) Inventors: Marcos A. Simplicio, Jr., São Paulo (BR); Eduardo Lopes Cominetti, São Paulo (BR); Harsh Kupwade Patil, Santa Clara, CA (US); Jefferson E. Ricardini, Santa Clara, CA (US); Leonardo T. D. Ferraz, São Paulo (BR); Marcos Vinicius M. Silva, São Paulo (BR)

(73) Assignees: LG ELECTRONICS, INC., Seoul (KR); UNIVERSITY OF SAO PAULO, Sao Paulo (BR)

( * ) Notice: Subject to any disclaimer, the term of this patent is extended or adjusted under 35 U.S.C. 154(b) by 127 days.

(21) Appl. No.: 16/995,172

(22) Filed: Aug. 17, 2020

(65) Prior Publication Data
US 2020/0382325 A1 Dec. 3, 2020

Related U.S. Application Data

(63) Continuation of application No. 16/136,621, filed on Sep. 20, 2018, now Pat. No. 10,771,265.
(Continued)

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/006* (2013.01); *H04L 9/008* (2013.01); *H04L 9/0825* (2013.01);
(Continued)

(58) Field of Classification Search
None
See application file for complete search history.

(56) References Cited

U.S. PATENT DOCUMENTS 5,432,852 A 7/1995 Leighton et al.
8,549,284 B1 10/2013 Kherani
(Continued)

OTHER PUBLICATIONS

Bianchi et al.; The SPARTA pseudonym and authorization system; 2008; retrieved from the Internet https://www.sciencedirect.com/science/article/pii/S0167642308001081; pp. 1-11, as printed. (Year: 2008).*

(Continued)

*Primary Examiner* — Michael W Chao
(74) *Attorney, Agent, or Firm* — Duane Morris LLP; Philip Woo

(57) ABSTRACT

Improved pseudonym certificate management is provided for connected vehicle authentication and other applications. Temporary revocation of a certificate is enabled. With respect to Security Credential Management Systems (SCMS), pre-linkage values can be employed. The pre-linkage values can be encrypted using homomorphic encryption. Other embodiments are also provided.

20 Claims, 13 Drawing Sheets

Related U.S. Application Data

(60) Provisional application No. 62/561,667, filed on Sep. 21, 2017.

(51) Int. Cl.

| | | |
|---|---|---|
| *H04L 9/00* | (2022.01) | |
| *H04L 9/40* | (2022.01) | |
| *H04W 12/04* | (2021.01) | |
| *H04W 12/069* | (2021.01) | |
| *H04W 4/40* | (2018.01) | |
| *H04L 67/12* | (2022.01) | |

(52) U.S. Cl.
CPC .......... *H04L 9/0861* (2013.01); *H04L 9/0869* (2013.01); *H04L 9/321* (2013.01); *H04L 9/3239* (2013.01); *H04L 9/3247* (2013.01); *H04L 9/3297* (2013.01); *H04L 63/0823* (2013.01); *H04L 63/104* (2013.01); *H04L 63/108* (2013.01); *H04W 12/04* (2013.01); *H04W 12/069* (2021.01); *H04L 9/50* (2022.05); *H04L 63/0421* (2013.01); *H04L 63/068* (2013.01); *H04L 67/12* (2013.01); *H04L 2209/42* (2013.01); *H04L 2209/805* (2013.01); *H04L 2209/84* (2013.01); *H04W 4/40* (2018.02)

(56) References Cited

U.S. PATENT DOCUMENTS

| | | | |
|---|---|---|---|
| 8,666,992 | B2 | 3/2014 | Serrano et al. |
| 9,876,823 | B2* | 1/2018 | Smith .................... H04L 9/088 |
| 10,484,351 | B2 | 11/2019 | Romansky et al. |
| 10,503,881 | B2 | 12/2019 | Lattin et al. |
| 10,581,620 | B2 | 3/2020 | Meyer et al. |
| 10,599,819 | B2 | 3/2020 | Lattin et al. |
| 11,303,458 | B2* | 4/2022 | Barrett .................... H04L 51/18 |
| 11,444,768 | B2* | 9/2022 | Maim ...................... H04L 9/32 |
| 2002/0103999 | A1* | 8/2002 | Camnisch ............. H04L 9/3218 713/155 |
| 2003/0190046 | A1* | 10/2003 | Kamerman ........... H04L 9/3265 713/176 |
| 2004/0225616 | A1* | 11/2004 | Arnold .................... H04L 9/321 705/74 |
| 2007/0222555 | A1 | 9/2007 | Tengler et al. |
| 2011/0119744 | A1* | 5/2011 | Cho ....................... H04L 9/3234 726/6 |
| 2011/0154045 | A1* | 6/2011 | Lee ....................... H04L 9/3255 713/176 |
| 2011/0258435 | A1 | 10/2011 | Bellur et al. |
| 2012/0070000 | A1 | 3/2012 | Baechler et al. |
| 2012/0072723 | A1 | 3/2012 | Orsini et al. |
| 2012/0079602 | A1 | 3/2012 | Kolesnikov et al. |
| 2014/0019754 | A1* | 1/2014 | Heen .................... H04L 9/3247 713/162 |
| 2014/0093077 | A1 | 4/2014 | Jawurek et al. |
| 2015/0256348 | A1 | 9/2015 | Tschache et al. |
| 2018/0316511 | A1* | 11/2018 | Meyer ................. H04W 12/35 |
| 2019/0116048 | A1* | 4/2019 | Chen ...................... H04W 4/48 |
| 2019/0174307 | A1* | 6/2019 | Wang .................. H04L 63/0421 |
| 2019/0245831 | A1 | 8/2019 | Petit et al. |
| 2021/0067967 | A1* | 3/2021 | Arzelier .............. H04W 12/069 |
| 2022/0200794 | A1* | 6/2022 | Saxena ................. H04L 9/0844 |
| 2022/0201015 | A1* | 6/2022 | Petit .................... H04L 63/1416 |
| 2022/0209964 | A1* | 6/2022 | Barrett ................. H04L 9/3268 |
| 2022/0271950 | A1* | 8/2022 | Barrett ................. H04L 63/062 |
| 2022/0294622 | A1* | 9/2022 | Destefanis ............ H04L 9/0643 |

OTHER PUBLICATIONS

International Search Report issued by the International Searching Authority dated Feb. 1, 2019 for PCT Application No. PCT/US2018/051945. pp. 1-3.

Written Opinion issued by the International Searching Authority dated Feb. 1, 2019 for PCT Application No. PCT/US2018/051945. pp. 1-8.

W. Whyte, A. Weimerskirch, V. Kumar, and T. Hehn, "A security credential management system for V2V communications," IEEE Vehicular Networking Conference, 2013, pp. 1-8.

Camp, "Security credential management system proof-of-concept implementation—EE requirements and specifications supporting SCMS software release 1.1," Vehicle Safety Communications Consortium, Tech. Rep., May 2016. [Online], Available: https://www.its.dot.gov/pilots/pdf/SCMS_POC_EE_Requirements.pdf.

M. Khodaei and P. Papadimitratos, "The key to intelligent transportation: Identity and credential management in vehicular communication systems," IEEE Vehicular Technology Magazine, vol. 10, No. 4, pp. 63-69, Dec. 2015.

NIST, Federal Information Processing Standard (FIPS 197)—Advanced Encryption Standard (AES), National Institute of Standards and Technology, U.S. Department of Commerce, National Institute of Standards and Technology, U.S. Department of Commerce. Gaithersburg, MD, USA, Nov. 2001, available: http://csrc.nist.gov/publications/fips/fips197/fips-197.pdf.> Nov. 2001.

NIST, Federal Information Processing Standard (FIPS 180-4)—Secure Hash Standard (SHS), National Institute of Standards and Technology, U.S. Department of Commerce, National Institute of Standards and Technology, U.S. Department of Commerce (NIST). Gaithersburg, MD, USA, Aug. 2015, dOI:10.6028/NIST.FIPS.180-4. Aug. 2015.

NIST, Federal Information Processing Standard (FIPS 202)—SHA-3 Standard: Permutation-Based Hash and Extendable-Output Functions, National Institute of Standards and Technology, U.S. Department of Commerce, National Institute of Standards and Technology, U.S. Department of Commerce. Gaithersburg, MD, USA, Aug. 2015, dOI:10.6028/NIST.FIPS.202.

J. Douceur, "The Sybil attack," in Proc. of 1st International Workshop on Peer-to-Peer Systems (IPTPS). Springer, Jan. 2002. [Online], Available: https://www.microsoft.com/en-us/research/publication/the-sybil-attack/.

R. Moalla, B. Lonc, H. Labiod, and N. Simoni, "Risk analysis study of ITS communication architecture." in 3rd International Conference on The Network of the Future, 2012, pp. 2036-2040.

L. Lamport, "Password authentication with insecure communication," Commun. ACM, vol. 24, No. 11, pp. 770-772, 1981.

E. Biham, "How to decrypt or even substitute DES-encrypted messages in 228 steps," Inf. Process. Lett., vol. 84, No. 3, Nov. 2002, pp. 117-124.

N. Mouha and A. Luykx, "Multi-key security: The Even-Mansour construction revisited," in Advances in Cryptology—CRYPTO 2015: 35th Annual Cryptology Conference. Berlin, Heidelberg: Springer Berlin Heidelberg, 2015, pp. 209-223.

D. Cooper, S. Santesson, S. Farrell, S. Boeyen, R. Housley, and W. Polk, "RFC 5280—Internet X.509 Public Key Infrastructure Certificate and Certificate Revocation List (CRL) profile," RFC 5280—https://tools.ietf.org/html/rfc5280#section-4.2.1.3, May 2008.

D. McGrew, M. Curcio, and S. Fluhrer, "Hash-based signatures," Internet Engineering Task Force, Internet-Draft draft-mcgrew-hash-sigs-06, Mar. 2017, work in Progress. [Online]. Available: https://datatracker.ietf.org/doc/html/draft-mcgrew-hash-sigs-06 Mar. 2017.

E. Andrade, M. Simplicio, P. Barreto, and P. Santos. "Lyra2: efficient password hashing with high security against time-memory trade-offs," IEEE Transactions on Computers, vol. 65, No. 10, 2016, see also: http://eprint.iacr.org/2015/136. pp. 3096-3108.

C. Perera, A. Zaslavsky, P. Christen, and D. Georgakopoulos, "Context aware computing for the internet of things: A survey," IEEE Communications Surveys Tutorials, vol. 16, No. 1, 2014, pp. 414-454, 2014.

J. Harding, G. Powell, R. Yoon, J. Fikentscher, C. Doyle, D. Sade, M. Lukuc, J. Simons, and J. Wang, "Vehicle-to-vehicle communications: Readiness of V2V technology for application," National Highway Traffic Safety Administration, Washington, DC, USA, Tech. Rep. DOT HS 812 014, 2014.

(56) References Cited

OTHER PUBLICATIONS

S. Chen, J. Hu, Y. Shi, Y. Peng, J. Fang, R. Zhao, and L. Zhao, "Vehicle-to-everything (v2x) services supported by LTE-based systems and 5G," IEEE Communications Standards Magazine, vol. 1, No. 2, pp. 70-76, 2017.

P. Papadimitratos, A. L. Fortelle, K. Evenssen, R. Brignolo, and S. Cosenza, "Vehicular communication systems: Enabling technologies, applications, and future outlook on intelligent transportation," IEEE Communications Magazine, vol. 47, No. 11, pp. 84-95, Nov. 2009.

NHTSA, "Federal Motor Vehicle Safety Standards; V2V Communication," National Highway Traffic Safety Administration, U.S. Department of Transportation (USDOT), Tech. Rep. Jan. 8, 2017. [Online]. Available: https://www.federalregister.gov/documents/2017/01/12/2016-31059/federal-motor-vehicle-safety-standards-v2v-communications.

D. Jiang and L. Delgrossi, "IEEE 802.11p: Towards an international standard for wireless access in vehicular environments," in IEEE Vehicular Technology Conference (VTC Spring), 2008, pp. 2036-2040.

F. Schaub, Z. Ma, and F. Kargl, "Privacy requirements in vehicular communication systems," in Proc. of the International Conference on Computational Science and Engineering, vol. 3. IEEE, 2009, pp. 139-145.

P. Cincilla, O. Hicham, and B. Charles, "Vehicular PKI scalability-consistency tradeoffs in large scale distributed scenarios," in IEEE Vehicular Networking Conference (VNC), Dec. 2016, pp. 1-8.

J. Petit, F. Schaub, M. Feiri, and F. Kargl, "Pseudonym schemes in vehicular networks: A survey," IEEE Communications Surveys Tutorials, vol. 17, No. 1, pp. 228-255, 2015.

M. Khodaei, H. Jin, and P. Papadimitratos, "Towards deploying a scalable & robust vehicular identity and credential management infrastructure," in 2014 IEEE Vehicular Networking Conference (VNC), Dec. 2014, pp. 33-40.

V. Kumar, J. Petit, and W. Whyte, "Binary hash tree based certificate access management for connected vehicles," in Proc. of the 10th ACM Conference on Security and Privacy in Wireless and Mobile Networks, ser. WiSec'17. New York, NY, USA: ACM, 2017, pp. 145-155.

M. Simplicio, E. Cominetti, H. K. Patil, J. Ricardini, and M. Silva, "The unified butterfly effect: Efficient security credential management system for vehicular communications," IACR eprint archive: https://eprint.iacr.org/2018/089.pdf, 2018.

IEEE, IEEE Standard Specifications for Public-Key Cryptography—Amendment 1: Additional Techniques, IEEE Computer Society, 2004.

Federal Information Processing Standard (FIPS 186-4)—Digital Signature Standard (DSS), National Institute of Standards and Technology, U.S. Department of Commerce, National Institute of Standards and Technology, U.S. Department Jul. 2013.

S. Josefsson and I. Liusvaara, "RFC 8032—Edwards-Curve Digital Signature Algorithm(EdDSA)," https://tools.ietf.org/html/rfc8032, Jan. 2017.

IEEE, "IEEE standard for wireless access in vehicular environments-security services for applications and management messages—amendment 1," IEEE Std 1609.2a-2017 (Amendment to IEEE Std 1609.2-2016), Oct. 2017, pp. 1-123.

D. Förster, F. Kargl, and H. Lohr, "PUCA: A pseudonym scheme with strong privacy guarantees for vehicular ad-hoc networks," Ad Hoc Networks, vol. 37, pp. 122-132, 2016, Special Issue on Advances in Vehicular Networks.

M. Raya, P. Papadimitratos, I. Aad, D. Jungels, and J.-P. Hubaux, "Eviction of misbehaving and faulty nodes in vehicular networks," IEEE Journal on Selected Areas in Communications, vol. 25, No. 8, 2007.

J. J. Haas, Y.-C. Hu, and K. P. Laberteaux, "Design and analysis of a lightweight certificate revocation mechanism for vanet," in Proceedings of the sixth ACM international workshop on VehiculAr InterNETworking. ACM, 2009, pp. 89-98.

E. Verheul, "Activate later certificates for V2X—combining ITS efficiency with privacy," Cryptology ePrint Archive, Report 2016/1158, 2016. [Online], Available: http://eprint.iacr.org/2016/1158.

K. Alheeti, A. Gruebler, and K. McDonald-Maier, "An intrusion detection system against malicious attacks on the communication network of driverless cars," in 12th Annual IEEE Consumer Communications and Networking Conference (CCNC), Jan. 2015, pp. 916-921.

Certicom, "Sec 4 v1.0: Elliptic curve Qu-Vanstone implicit certificate scheme (ECQV)," Certicom Research, Tech. Rep., 2013, http://www.secg.org/sec4-1.0.pdf.

NIST, Special Publication 800-131A Rev. 1—Transitions: Recommendation for Transitioning the Use of Cryptographic Algorithms and Key Lengths, National Institute of Standards and Technology, U.S. Department of Commerce, Gaithersburg, MD, USA, Nov. 2015, dOI:10.6028/NIST.SP.800-131Ar1.

D. Aranha and C. Gouvêa. RELIC is an Efficient Library for Cryptography. https://github.com/relic-toolkit/relic, 2018.

Daniel Brown, Robert Gallant, and Scott Vanstone. "Provably secure implicit certificate scheme,". Financial Cryptography, pp. 156-165, Berlin, Heidelberg, 2002. Springer.

Jean-Sébastien Coron, Marc Joye, David Naccache, and Pascal Paillier, "Universal padding schemes for RSA," Advances in Cryptology (CRYPTO'02), London, UK, UK, 2002. Springer. pp. 226-241.

Gemalto. SafeNet Luna Network HSM—product brief. https://safenet.gemalto.com/, 2018.

A. Iyer, A. Kherani, A. Rao, and A. Karnik, "Secure V2V communications: Performance impact of computational overheads," IEEE Infocom Workshops, pp. 1-6, Apr. 2008.

Kristin E Lauter and Katherine E Stange, "The elliptic curve discrete logarithm problem and equivalent hard problems for elliptic divisibility sequences,". Selected Areas in Cryptography (SAC'08), pp. 309-327. Springer, 2008.

M. Simplicio, E. Cominetti, H. Kupwade Patil, J. Ricardini, L. Ferraz, and M. Silva, "A privacy-preserving method for temporarily linking/revoking pseudonym certificates in vanets," 17th IEEE Int. Conf. on Trust, Security and Privacy in Computing and Communications (TrustCom'18), 2018. See also eprint.iacr.org/2018/185.

Paillier, Pascal "Public-key cryptosystems based on composite degree residuosity classes," Advances in cryptology—EUROCRYPT'99. Springer, 1999, pp. 223-238.

NISTp256 (National Institute of Standards and Technology. (Jul. 1999) Recommended elliptic curves for federal government use. Available: http://csrc.nist.gov/groups/ST/toolkit/documents/dss/NISTReCur.doc Jul. 1999.

European Patent Office, "The Partial Supplementary European Search Report," dated Aug. 25, 2021, 15 pages.

William Whyte et al., "A Security Credential Management System for V2V Communications," 2013 IEEE Vehicular Networking Conference, IEEE, Dec. 16, 2013 (Dec. 16, 2013), pp. 1-8.

Rich Kennedy, U.S. Department of Transportation, "Vehicle to Vehicle Communications: Readiness of V2V Technology for Application," vol. 802.18, Aug. 21, 2014 (Aug. 21, 2014), pp. 1-327, Retrieved from the Internet: URL:https://mentor.ieee.org/802.18/dcn/14/18-14-0061-00-0000-nhtsa-repoert-on-v2v-communications.pdf.

David Eckhoff et al., "Marrying safety with privacy: A holistic solution for location privacy in VANETs11," 2016 IEEE Vehicular Networking Conference (VNC), Dec. 2016 (Dec. 8, 2016), pp. 1-8.

D. Bernstein, N. Duif, T. Lange, P. Schwabe, and B.-Y. Yang, "EdDSA for more curves," Journal of Cryptographic Engineering, vol. 2, No. 2, Sep. 2012, see also http://ed25519.cr.yp.to/eddsa-20150704.pdf. pp. 77-89.

Daniel J. Bernstein, Niels Duif, Tanja Lange, Peter Schwabe, and Bo-Yin Yang, "High-speed high-security signatures", In Cryptographic Hardware and Embedded Systems—CHES 2011, 2011, Berlin, Heidelberg, 2011, Springer Berlin Heidelberg, pp. 124-142.

U.S. Appl. No. 62/575,514, filed Oct. 22, 2017.

U.S. Appl. No. 16/165,871, filed Oct. 19, 2018.

B. Preneel, Davies-Meyer Hash Function. Boston, MA: Springer US, 2005, pp. 136-136.

(56) References Cited

OTHER PUBLICATIONS

ETSI, "TR 102 941—Intelligent Transport Systems (ITS); Security; Trust and Privacy Management," European Telecommunications Standards Institute, Tech Rep., Jun. 2012.

* cited by examiner

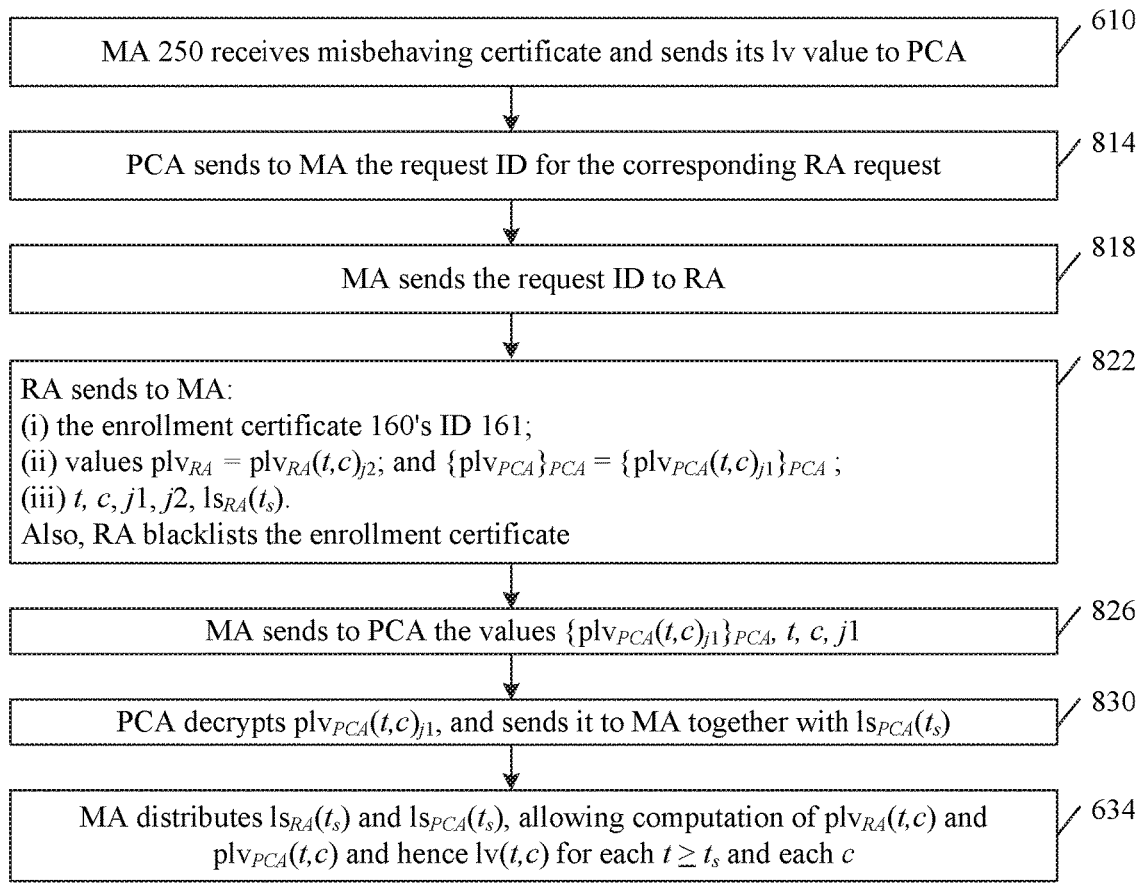
FIG. 12
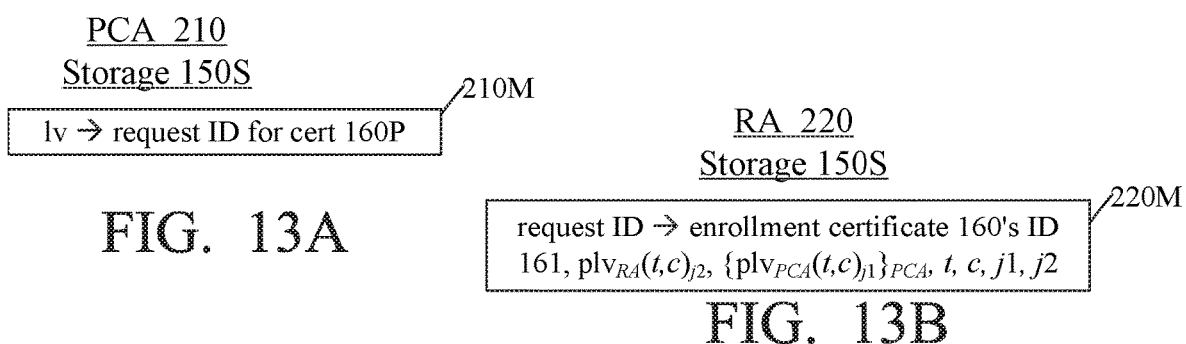

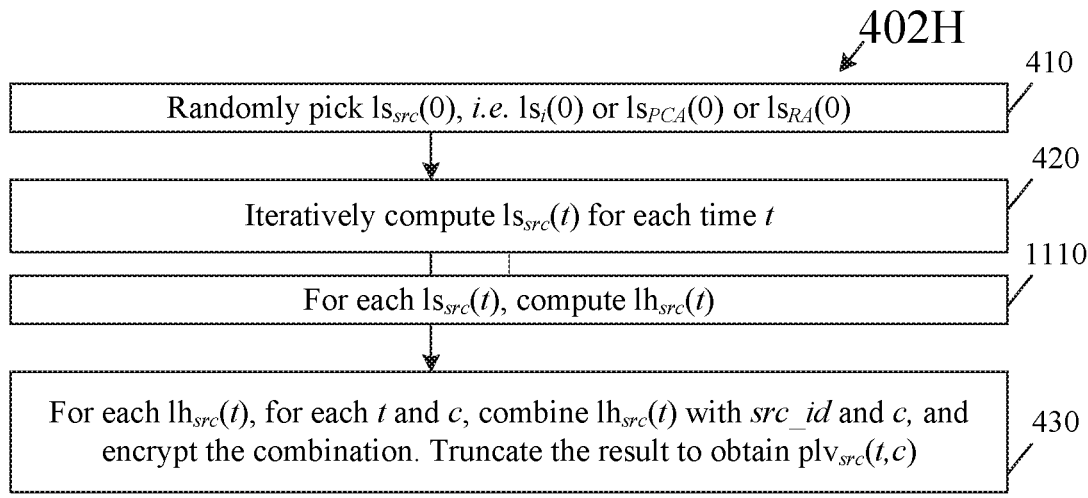
FIG. 16
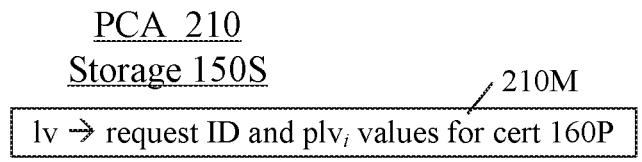
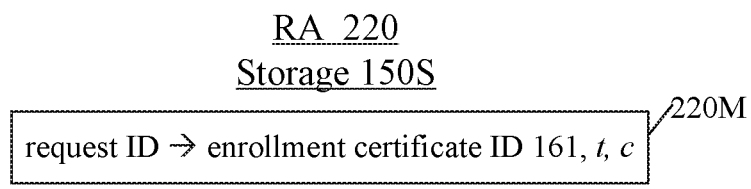
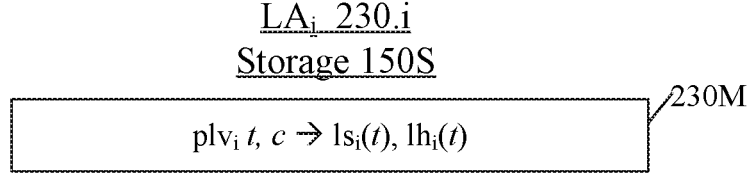
FIG. 17

CRYPTOGRAPHIC METHODS AND SYSTEMS FOR MANAGING DIGITAL CERTIFICATES WITH LINKAGE VALUES

CROSS REFERENCE TO RELATED APPLICATIONS

The present application is a continuation of U.S. patent application Ser. No. 16/136,621, filed on Sep. 20, 2018, which claims priority to U.S. Provisional Patent Application No. 62/561,667, "SECURITY IN VEHICULAR COMMUNICATIONS," filed on Sep. 21, 2017, both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to secure communications, including transportation-related communications among cars, trucks, trains, and possibly other vehicles, as well as pedestrians' smartphones, traffic lights, and other infrastructure.

In recent times, there has been a surge in digital technologies embedded in physical objects, leading to what is today known as Internet of Things (IoT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

SUMMARY

This section summarizes some features of the invention. Other features may be described in the subsequent sections. The invention is defined by the appended claims, which are incorporated into this section by reference.

Some embodiments of the present invention provide certificate management techniques, including certificate revocation techniques, that reduce the number of certificate management entities while providing high security.

Also, some embodiments increase the system security with only a minimal increase of computation and/or data.

BRIEF DESCRIPTION OF THE DRAWINGS

FIGS. 11A, 11B, 11C, 12 are also flowcharts of processes used in managing digital certificates.

FIGS. 13A, 13B, 14, 15 illustrate data structures for digital certificate management.

FIG. 16 is a flowchart of a process used in digital certificate management.

FIG. 17 illustrates data structures for digital certificate management.

DETAILED DESCRIPTION OF SOME EMBODIMENTS

This description and the accompanying drawings that illustrate aspects, embodiments, implementations, or applications should not be taken as limiting the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
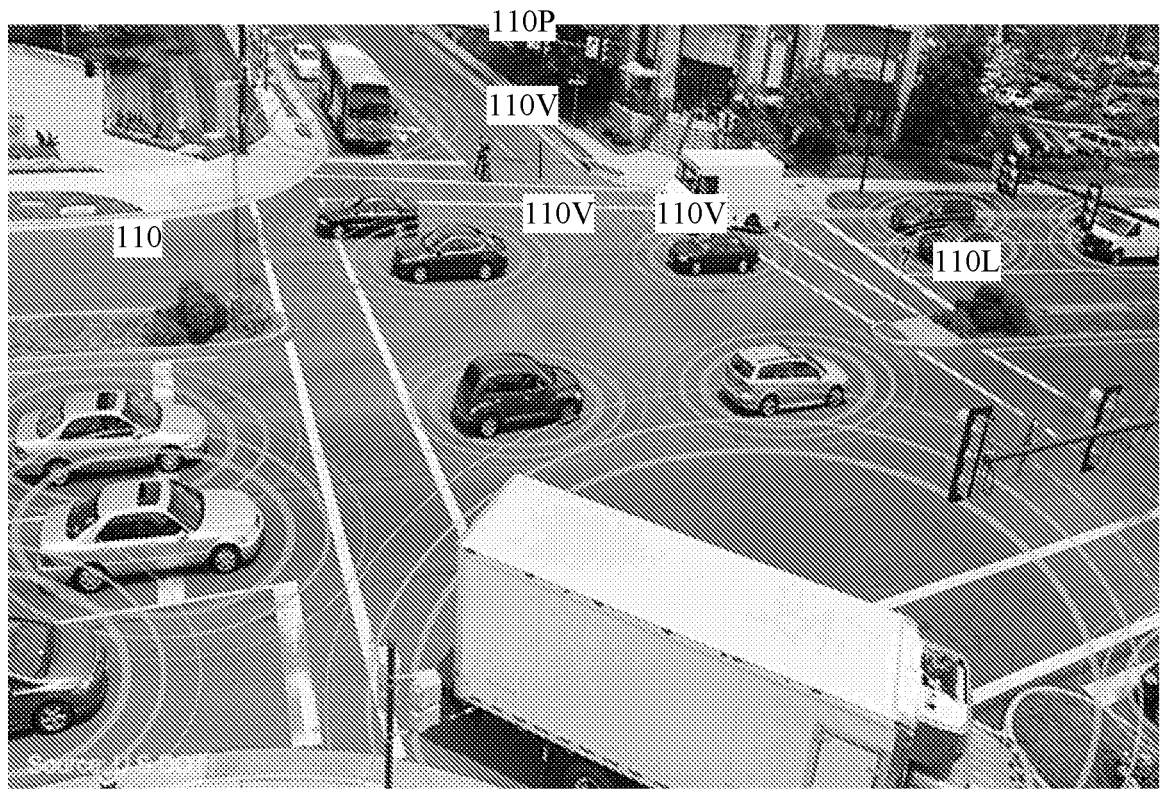
FIG. 1 is illustrates an environment in which systems and methods of the present disclosure can operate.

FIG. 1 is illustrates an environment in which systems and methods of the present disclosure can operate. FIG. 1 shows a busy intersection with various entities or objects, such as vehicles 110V (cars, trucks, and possibly other types, e.g. trains or bicycles), pedestrians 110P, roadside equipment 110L (e.g., traffic lights, along with hub or gateway for short and longer-range communications). Each of objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
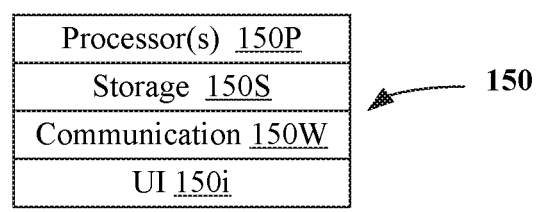
FIG. 2 is a block diagram of a computing device for use in the example environment.

FIG. 2 illustrates an embodiment of a computing device 150 used by the vehicles or other entities and objects, e.g., for communicating, coordinating, etc. in the environment of FIG. 1. As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 100 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

Figure 3:
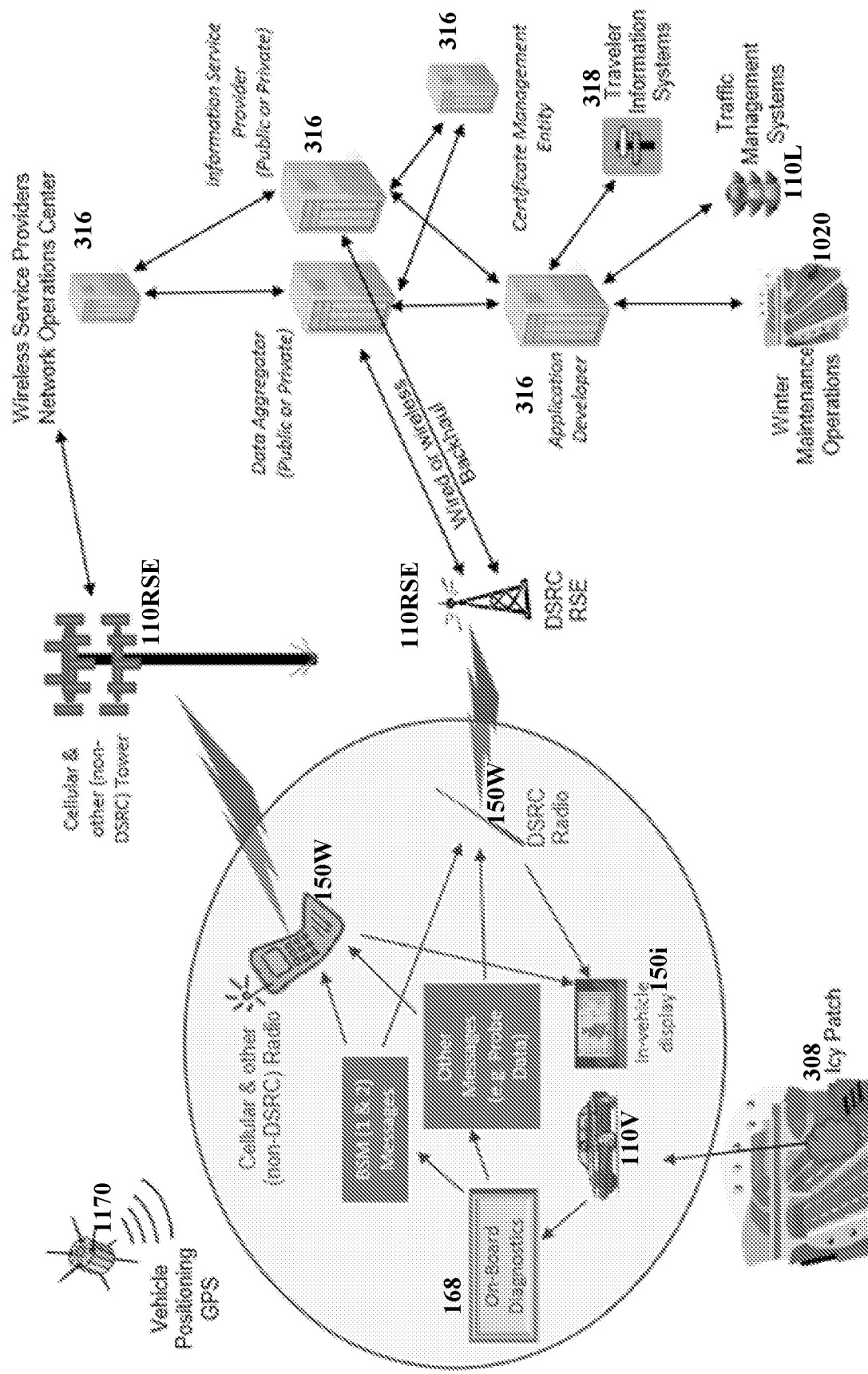
FIG. 3 is a representation of communications among vehicles and other equipment in the example environment.

FIG. 3 illustrates examples of communication schemes for entities or objects 110 or their computing devices 150 ("object 110", "user 110", and "equipment 150" may be used interchangeably herein when no confusion arises), interacting via V2X or connected vehicle technology. At a scene 308, a vehicle 110V encounters an icy road patch.

The vehicle 110V may include or incorporate one or more sensors such as accelerometers, brake monitors, object detectors, LIDAR, etc. for sensing conditions within and around vehicles 110V, such as sudden breaking, wheel spin, potential collisions, etc. Using these sensors, the vehicle 110V may, for example, detect the icy road patch at scene 308. The sensors supply information to computing device or equipment 150 (FIG. 2) so that it can take action according, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:f/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or road side equipment (RSE) HORSE directly, i.e., without intermediate network switches. The RSE may act like a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in a scene 1020, and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate, or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 in can be implemented or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process the same, and communicate information or instructions throughout the environment in order to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect from such misbehavior, the communications should be authenticated, for example, using a public-key infrastructure (PKI). In PKI, each vehicle 110V or other equipment is provided with a private key (e.g., for signing a message) and a public key (e.g., for signature verification). The public key is distributed to the public, but the private key is kept secret.

Figure 4:
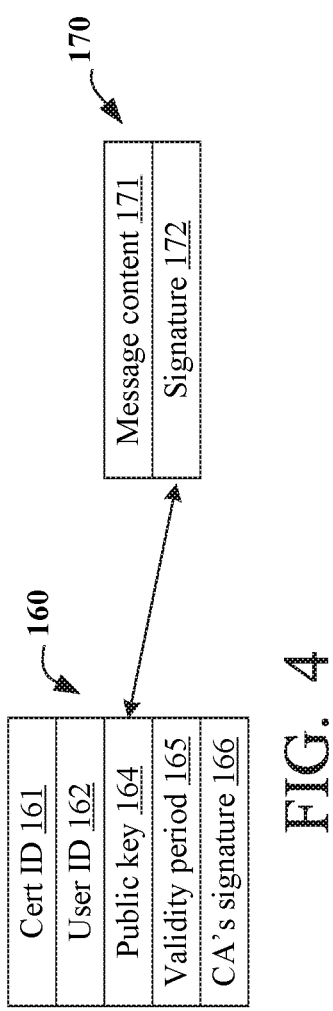
FIGS. 4 and 5 illustrate examples of digital certificates for message authentication.
Figure 5:
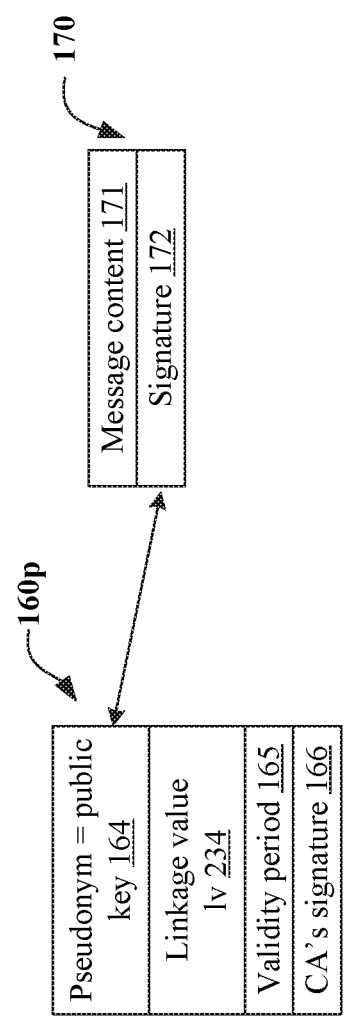

FIGS. 4 and 5 illustrate examples of digital certificates which can be used for message authentication in the connected vehicle or V2X technology environment. Referring to FIG. 4, a digital certificate 160 is shown.

Digital certificate 160 has a number of fields or parameters. In some embodiments, these include a certificate ID 161, a user ID 162 (e.g., a vehicle ID number or the user's email address), the vehicle's (or user's) public key 164, and possibly other parameters, such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

In a variation called "implicit certificate", the public key 164 is absent from the certificate, and is replaced by data allowing anyone having the CA's public key to derive the certificate's public key 164, as in the case of "implicit certificates". See "Certicom. Sec 4 v1.0: Elliptic curve Qu-Vanstone implicit certificate scheme (ECQV). Technical report, Certicom Research, 2013. http://www.secg.org/sec4-1.0.pdf", incorporated herein by reference. In either case, the certificate makes the public key 164 publicly available.

Digital certificate 160 can be issued to a vehicle 110V to authenticate the public key. The vehicle attaches its certificate 160 to each message 170 transmitted by the vehicle 110V. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

If the vehicle misbehaves (maliciously or due to a malfunction), its certificate 160 can be revoked. For example, the CA will not issue a new certificate after the expiration of validity period 165. Validity period 165 can be used by message recipients to detect expired certificates.

A disadvantage of this scheme is potentially compromising user privacy: if a vehicle's transmissions are intercepted, the vehicle can be tracked by tracking the certificate ID 161 or user ID 162 transmitted by the vehicle. To protect user privacy, the user can be issued multiple pseudonym certificates with random-looking strings ("pseudonyms") instead of IDs 161 and 162. The vehicle then uses a pseudonym certificate instead of certificate 160 in message transmissions. The vehicle can automatically use different pseudonym certificates for different messages 170 to avoid tracking.

FIG. 5 illustrates a pseudonym certificate 160p accompanying a message 170. The pseudonym 164 acts as both the certificate ID and the public key (or as data from which the pseudonym is derivable if the certificate 160p is implicit). The certificate may include validity period 165, an identification of the signature scheme, CA signature 166, and maybe other parameters, similarly to certificate 160 of FIG. 4. Pseudonym certificate 160p also includes linkage value (1v) 234 used for certificate revocation as described below.

The vehicle attaches one of its pseudonym certificates 160p to each message 170 transmitted by the vehicle. The message recipient uses the CA's public key to verify the certificate's signature 166, and uses the pseudonym 164 to verify the message signature 172 and thus authenticate the message 170. In some embodiments, the verification of the certificate's signature 166 and message signature 172 can also be combined (e.g., for better performance). Such pseudonym certificates are used in Security Credential Management System (SCMS), originally proposed in Whyte et al., and later extended in CAMP.

Improved certificate management schemes are desirable. Of note, any computer entity involved in vehicular PKI (e.g., a computing device 150 or computer 316) can be compromised, and should be entrusted with only limited amount of information. Sensitive tasks and data should be distributed among different computer entities (e.g., computers or servers or other applications) so that, as long as the entities do not collude (i.e., the people operating the entities do not collude), the system would be secure. It is desirable however to reduce the number of certificate management entities in order to decrease the cost and complexity of certificate management without compromising security. Moreover, it is desirable to increase the system security with only a minimal increase of computation and/or data.

Security Credential Management System (SCMS)

Among the various pseudonym-based security solutions for V2X, one of the most prominent is the Security Credential Management System (SCMS). Indeed, SCMS is presently considered one of the leading vehicular public-key infrastructure (VPKI) candidate designs for protecting V2X—vehicle-to-vehicle (V2V) and vehicle-to-infrastructure (V2I)—communications in the United States. SCMS deals with revocable privacy while preventing any given certificate management entity from tracking devices 110/150 by the entity itself, i.e., without colluding with other system entities. By doing so, it copes with security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. IC), no. 4, pp. 63-69, December 2015, which is incorporated by reference.

General Notation

For convenience, Table I includes a list of the symbols and general notation adopted in this disclosure for the relevant environment including V2X, connected vehicle, and/or SCMS.

TABLE I

Symbols

| Symbol | Meaning |
|---|---|
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| $\hat{S}$ | Public cocoon key for signature |
| $\hat{E}$ | Public cocoon key for encryption |
| β | Number of cocoon keys in a batch of pseudonym certificates generated in response to a request to generate the pseudonym certificates |
| la_id | ID of a Linkage Authority (LA) |
| α | Number of LAs (typically two) |
| $ls_i$ | Linkage seed |
| $plv_i$ | Pre-linkage value |
| lv | Linkage value |
| τ | Number of time periods covered in a pseudonym certificate request |
| σ | Number of certificates valid in each time period |
| enc(key, str) | Encryption of a bit string str with key |
| hash(str) | Hash of str |

The notation $str_1 \| str_2$ is used to represent the concatenation of bit strings $str_1$ and $str_2$. The notation enc(key, str) denotes the encryption of a bit string str with key, which can be done using standard block ciphers such as the Advanced Encryption Standard (AES), as described in more detail in NIST, Federal Information Processing Standard (FIPS 197)—Advanced Encryption Standard (AES), National Institute of Standards and Technology, U.S. Department of Commerce, National Institute of Standards and Technology, U.S. Department of Commerce. Gaithersburg, Md., USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in [5] NIST, Federal Information Processing Standard (FIPS 180-4)—Secure Hash Standard (SHS), National Institute of Standards and Technology, U.S. Department of Commerce, Gaithersburg, Md., USA, August 2015, D01:10.6028/NIST.F1PS.180-4, and NIST, Federal Information Processing Standard (FIPS 202)—SHA-3 Standard: Permutation-Based Hash and Extendable-Output Functions, National Institute of Standards and Technology, U.S. Department of Commerce, Gaithersburg, Md., USA, August 2015, DOI: 10.6028/NIST.F1PS.202, both of which are incorporated by reference herein.

In SCMS, each device (110/150) receives two types of certificates: an enrollment certificate 160, which has a long expiration time T and identifies a valid device in the system; and multiple pseudonym certificates 160*p*, each having a short validity (e.g., a few days), in such a manner that σ≥1 pseudonym certificates may be valid simultaneously. For protecting its privacy, a particular vehicle may then frequently change the pseudonym certificate employed in the vehicle's communications, thus avoiding tracking by nearby vehicles or by roadside units. In practice, it is useful to limit the value of σ to a small number to avoid "sybil-like" attacks (as described in detail in [7] Douceur, "The Sybil attack," Proceedings of 1st International Workshop on Peer-to-Peer Systems (IPTPS). Springer, January 2002 (Available: https://www.microsoft.com/en-us/research/publication/the-sybil-attack/), which is incorporated by reference), in which one vehicle poses as a platoon aiming to gain some advantage over the system (see, Moalla et al., "Risk analysis study of ITS communication architecture," 3*rd International Conference and The Network of the Future*, 2012, pp. 2036-2040, which is incorporated by reference). For example, such a fake platoon could end up receiving preferential treatment from traffic lights programmed to give higher priority to congested roads.

Example SCMS Architecture

Figure 6:
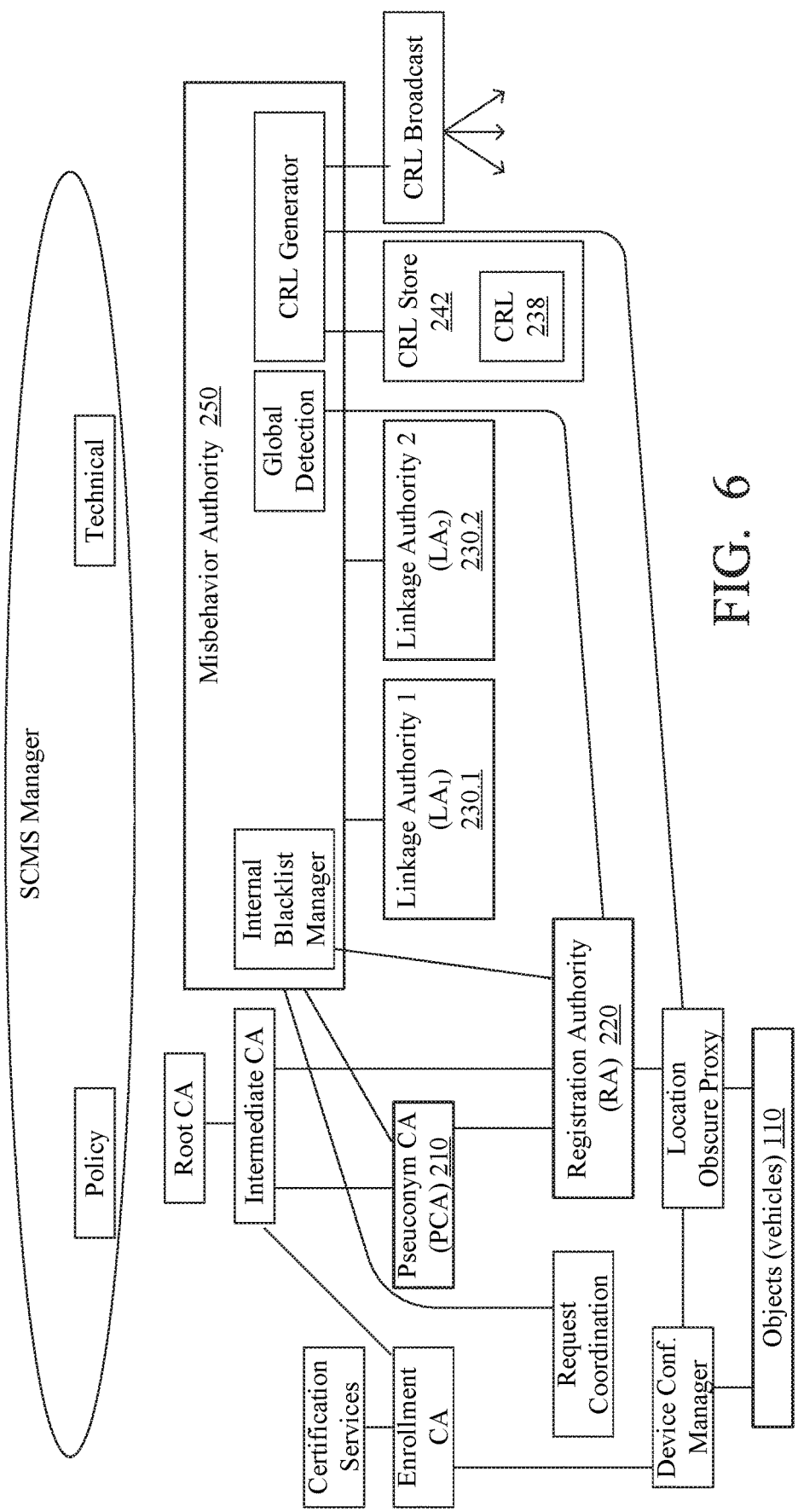
FIG. 6 is a block diagram illustrating computer system architecture suitable for digital certificate management.

FIG. 6 illustrates an exemplary computer system architecture environment for SCMS. SCMS was designed to allow the distribution of multiple pseudonym certificates to vehicles in an efficient manner, while providing mechanisms for easily revoking them in case of misbehavior by their owners.

In SCMS, a Registration Authority (RA) 220 creates batches of public keys from a single request, in the so-called butterfly key expansion process. RA 220 receives and validates requests for batches of pseudonym certificates 160*p* from objects 110/devices 150 identified by their enrollment certificates 160. The RA 220 then shuffles keys belonging to different users together before individually sending them to a Pseudonym Certificate Authority (PCA) 210. As such, the PCA 210 cannot link a group of requests to a same object 110/device 150. The PCA 210, in turn, creates valid certificates for those keys and encrypts them before delivering the results to the requesting vehicle 110V. PCA 210 is responsible for issuing pseudonym certificates 160*p* (FIG. 5) to entities or objects 110 (and their respective devices 150).

Linkage Authority (LA) 230, or rather linkage authorities $LA_1$ and $LA_2$—also labeled as 230.1 and 230.2—generate random-like bitstrings ($plv_i$ 392 in FIG. 8 described below) that are combined to create a linkage value (lv 234 in FIG. 5). The linkage values lv are added to pseudonym certificates 160*p* so that the pseudonym certificates can be efficiently revoked. The lv values are different for different pseudonym certificates, but they can be linked together for a given enrollment certificate 160 as described below. Thus, multiple certificates 160*p* belonging to a same object 110/device 150 can be linked together by adding a small amount of information, (two linkage seeds $ls_i$ 394 in FIG. 8), to certificate revocation lists (CRLs) 238 (FIG. 6) stored in CRL computer storage 242. The CRL 238 is used in the case of abuse, where the privacy of the misbehaving vehicle is annulled and all of its pseudonym certificates are revoked. In FIG. 6, two LAs, 230.1 and 230.2 are illustrated, even though the general architecture of SCMS can support or use more than two LAs.

Misbehavior Authority (MA) 250 identifies misbehavior by objects 110/devices 150 and, whenever necessary, revokes them. This can be accomplished (1) by placing the enrolment certificate 160 into an internal blacklist, so it cannot be used to request additional pseudonym certificates 160P anymore; and (2) by placing the pseudonym certificate 160P into a CRL 238, which is distributed to vehicles.

In some embodiments, each of RA 220, PCA 210, LAs 230, and MA 250 can be implemented with or incorporate one or more computing devices (e.g., computing device 150 or computer systems 316).

SCMS's Key Linkage

To avoid large certificate revocation lists (CRLs) 238, revocation is done in such a manner that many certificates from a same user 110 can be linked together by inserting only a small amount of information (ls, possibly 128 bits) into a CRL for revoking multiple pseudonym certificates 160p. In each pseudonym certificate 160p, the corresponding linkage value lv is computed by XORing "α" prelinkage values $plv_i$ (where $1 \leq i \leq \alpha$) provided by $\alpha \geq 2$ LAs 230. The generation of ls, and plv, by $LA_i$, i.e., LA 230.i, is done upon request by RA 220, as shown in FIGS. 7 and 8.

Figure 7:
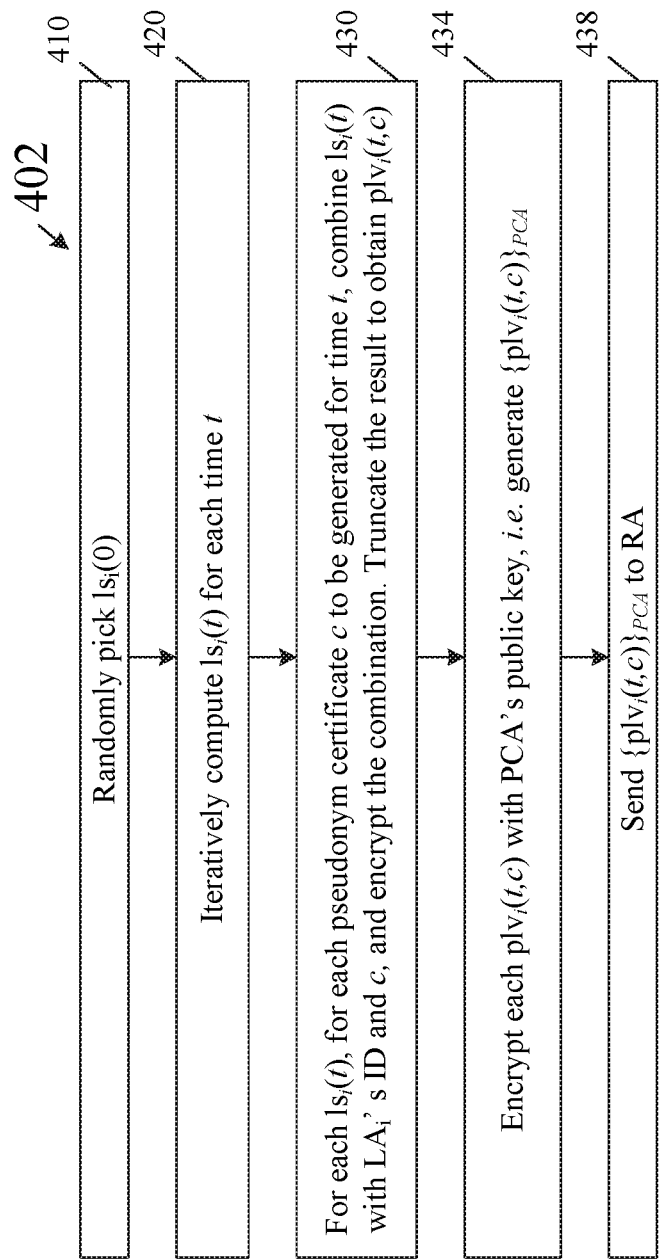
FIG. 7 is a flowchart illustrating a process used in generating digital certificates.

FIG. 7 is a flowchart of a method or process 402 for generating linkage seeds is and pre-linkage values ply, which are precursor for the computation of the linkage values lv placed into digital certificates. According to some embodiments, each $LA_i$ in the SCMS architecture performs process 402 shown in FIG. 7. The $LA_i$ receives an RA request to generate a batch of $plv_i(t,c)$ values for a batch of pseudonym certificates for a number τ of time periods. Each $plv_i(t,c)$ corresponds to a single pseudonym certificate 160p. The t parameter identifies a time period 165 (FIG. 5), and varies from 0 to τ-1. There are σ pseudonym certificates for each time period t, and the c parameter varies from 0 to σ-1.

Figure 8:
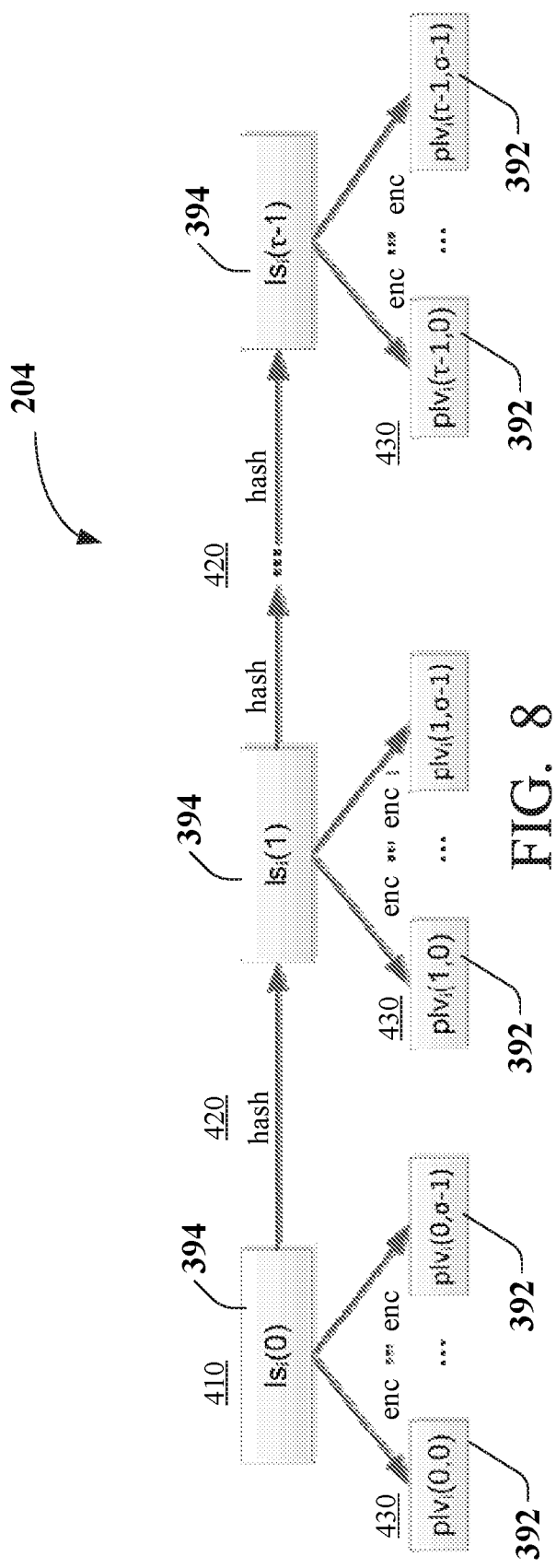
FIG. 8 illustrates a computer data structure used for digital certificate management.

In response to the RA request, $LA_i$ generates a tree structure 204, for example, as shown in FIG. 8. The $plv_i$ values are the leaves of this tree. Specifically, at step 410 of FIG. 7, $LA_i$ picks a random (e.g., 128-bit) linkage seed $ls_i(0)$. Then at step 420, as the RA's request covers r certificate time periods, $LA_i$ iteratively computes a τ-long hash chain (as described in Lamport, "Password authentication with insecure communication," Commun. ACM, vol. 24, no. 11, pp. 770-772, 1981, which is incorporated by reference herein), according to the following equation (Eq. 1):

$$ls_i(t) = \text{hash}(la\_id_i \| ls_i(t-1)) \quad \text{(Eq. 1)}$$

where $la\_id_i$ is $LA_i$'s identity string and $1 \leq t < \tau$.

At step 430, each $ls_i(t)$ is then used in the computation of σ pre-linkage values:

$$plv_i(t,c) = enc(ls_i(t), la\_id_i \| c), \text{for } 0 \leq c < \sigma-1 \quad \text{(Eq. 2)}$$

In some embodiments, the encryption is performed using similar-purpose schemes, such as the Davies-Meyer construction (see e.g., Preneel, *Davies-Meyer Hash Function*. Boston, Mass.: Springer US, 2005, pp. 136-136, which is incorporated by reference). This means that the cipher's input is XORed with the ciphertext produced as output. However, since such small modifications are not relevant for this discussion, we refrain from describing them aiming for a more concise notation. The encrypted value is truncated to a suitable length to obtain $plv_i(t,c)$.

Then at step 434, every $plv_i(t,c)$ is encrypted so only the PCA is able to decrypt it (e.g., using the PCA's public key). The encrypted values are shown as $\{plv_i(t,c)\}_{PCA}$. These values are then sent to RA 220 at step 438.

In some embodiments, before sending $\{plv_i(t,c)\}_{PCA}$ to RA 220, $LA_i$ signs each $\{plv_i(t,c)\}_{PCA}$. The signature can later be verified by PCA 210. This is done in order to prevent the RA from forging its own pre-linkage values $plv_i$ and then encrypting and delivering them to the PCA as if they came from $LA_i$, which would allow a dishonest RA to track devices 110.

PCA 210 can decrypt the $plv_i(t,c)$ values, and compute, for each pseudonym certificate, the linkage value lv 234 (FIG. 5) as:

$$lv(t,c) = plv_1(t,c) \oplus plv_2(t,c) \quad \text{(Eq. 3)}$$

Figure 9:
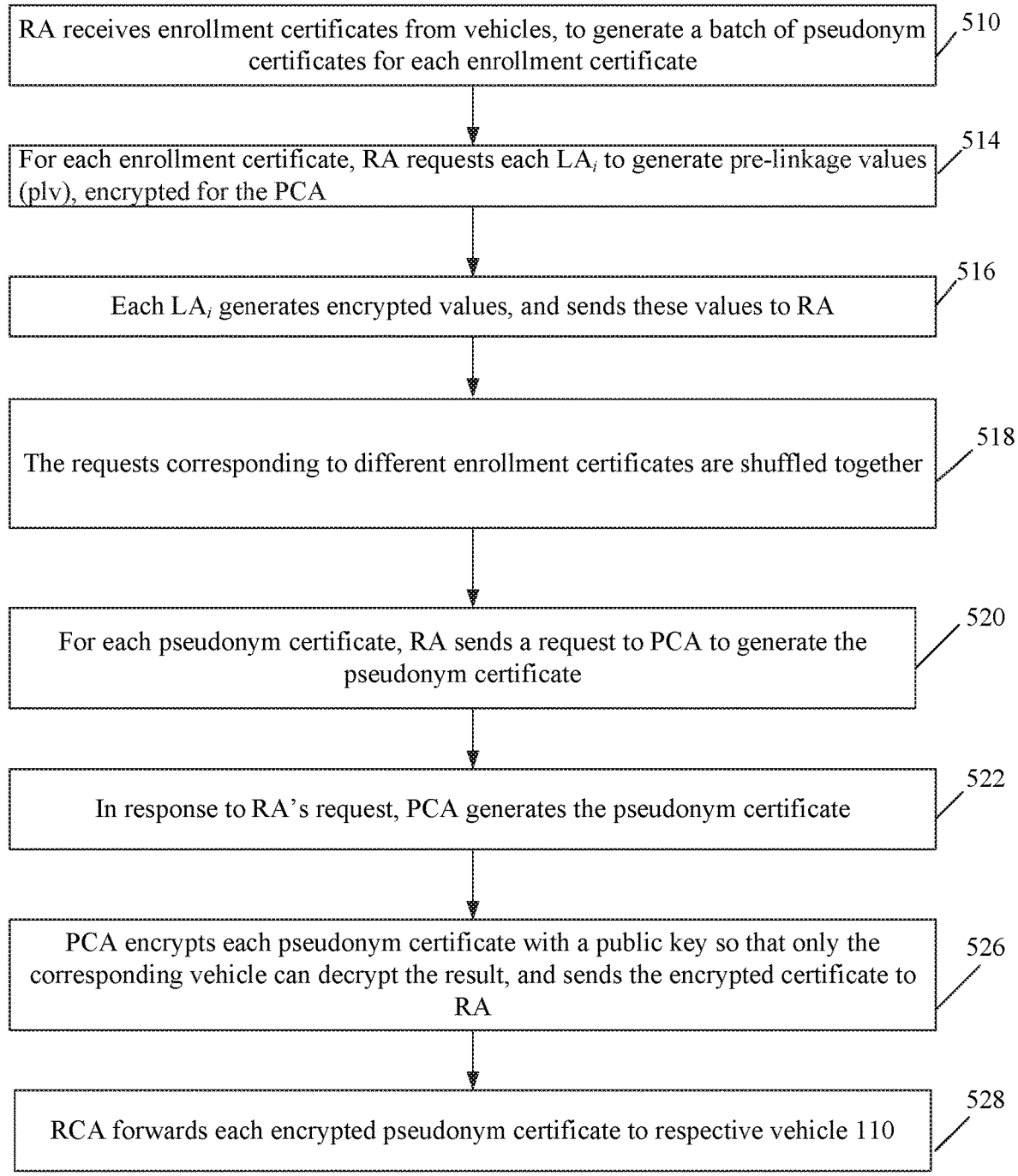
FIGS. 9 and 10 are flowcharts of processes used in managing digital certificates.

FIG. 9 illustrates a method or process 500 for generating a pseudonym certificate (including the lv value generated per FIG. 7). At step 510, RA 220 receives one or more enrollment certificates 160 from users 110. In some embodiments, each certificate 160 is accompanied by a request to generate a batch of pseudonym certificates 160p.

At step 514, for each enrollment certificate 160, RA 220 requests each of $LA_1$ and $LA_2$ to generate the $plv_i$ values. In response, at step 516, each $LA_i$ generates the $plv_i$ values, for example, by performing process 402 (FIG. 7), and sends the $\{plv_i(t,c)\}_{PCA}$ values to the RA 220. RA 220 itself cannot decrypt the $plv_i$ values.

At step 518, the RA shuffles the requests for different vehicles 110 so that the PCA cannot link the $plv_i$ values (and hence the lv values) to a particular vehicle 110 or its enrollment certificate 160.

At step 520, RA 220 sends a request to PCA 210, along with the $\{plv_i(t,c)\}_{PCA}$ values from the two LAs, together with the corresponding cocoon keys (described in Whyte et al.), so that the PCA can compute the linkage values lv to be included in the resulting certificates 160p. In some embodiments, a separate request is sent to the PCA 210 for each pseudonym certificate to be generated, and thus for each (t,c). The request includes the two encrypted $plv_i$ values for the pseudonym certificate 160p.

In response to each request, at step 522, PCA 210 generates the pseudonym certificate 160p. As part of this process, PCA 210 decrypts the $plv_i$ values, and computes the certificate's lv value as the XOR of the corresponding $plv_i$'s. In some embodiments, where two LAs 230 participate in this process, the linkage value lv is computed per equation (Eq. 3) above.

At step 526, PCA 210 encrypts the pseudonym certificate 160p with the corresponding public key 164 (e.g., computed based on a cocoon key), and sends the encrypted certificate 160p to RA 220 in a message which may include, for example, information enabling the user to generate a private key corresponding to the public key. The RA 220 cannot decrypt the certificate.

At step 528, the RA 220 forwards each message to respective vehicle 110. Vehicle 110 decrypts the pseudonym certificate because vehicle 110 can compute the private key from the vehicle's "caterpillar" keys as described in Whyte et al. (The public cocoon keys provided to the RA are also computed based on the public caterpillar keys, but the RA does not have the private counterpart of the public caterpillar keys.) Vehicle 110 may then use pseudonym certificate for communication with other vehicles, objects, or entities in the V2X or connected vehicle environment.

Revocation for Misbehavior

When a device 110 is identified as malicious by MA 250, the pseudonym certificates 160p that are associated to the same enrollment certificate 160 and that are still valid and owned by that device can be revoked not only individually, but also altogether. This is accomplished via the cooperation of the PCA 210, RA 220, and LAs 230 in the SCMS.

Figure 10:
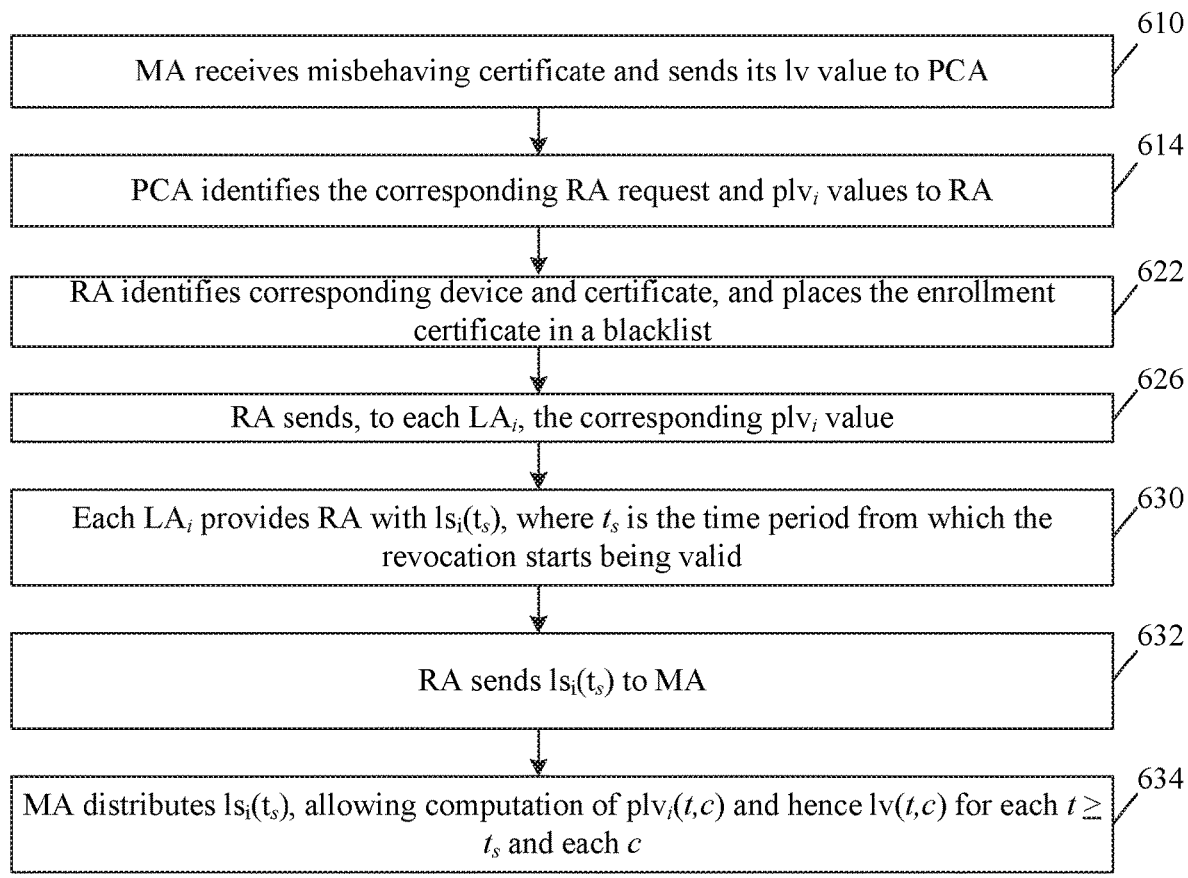

FIG. 10 illustrates a method or process used in revoking digital certificates, according to some embodiments. At a step 610, the MA may receive a pseudonym certificate 160p of a misbehaving device, or only the lv value from the certificate. The MA sends the lv value to PCA 210. At a step 614, the PCA associates the lv value to the original pseudonym certificate request received from the RA at step 520 (FIG. 9). The PCA then provides this information, together with the corresponding pre-linkage values $plv_i(t,c)$, to the RA. At step 622, the RA identifies the device 110 behind that certificate request, and places the corresponding enrollment certificate 160 in a blacklist. The blacklist (not shown) is a database checked by the RA at step 510 (FIG. 9) for each enrollment certificate 160 received by the RA. If the enrollment certificate is in the database, the RA will not generate any pseudonym certificates 160p for the enrollment certificate 160.

At step 626, the RA sends, to each LA the corresponding pre-linkage value $plv_i(t,c)$. At step 630, each $LA_i$ provides RA with $ls_i(t_s)$, where $t_s$ is the time period from which the revocation starts being valid (usually, the current time period or the one in which the misbehavior was first detected). At step 632, the RA sends the $ls_i(t_s)$ values to the MA. The MA is responsible for CRL maintenance and distribution. Therefore, at step 634, the MA places the set of $ls_i(t_s)$ in CRL 238 to be distributed throughout the system, including the devices 110, to allow any entity (e.g., vehicle 110V) to compute $plv_i(t,c)$, and hence $lv(t,c)$, for time periods $t \geq t_s$ for all c, linking the corresponding certificates 160p to a single CRL entry consisting of the two $ls_i$ values $ls_i(t_s)$. As seen in FIG. 8, $ls_i(t_s)$ is sufficient to compute the pre-linkage values $plv_i(t,c)$ for all $t \geq t_s$ and all c. Knowledge of both $ls_i(t_s)$, for i=1, 2, is sufficient to computer all $lv(t,c)$ for all $t \geq t_s$ and all c. Consequently, current and future certificates 160p owned by the misbehaving device 110 are revoked and can be linked to that device. If any vehicle, or any other entity, receives a message with a certificate 160p (FIG. 5), the receiving vehicle or other entity can ascertain the validity of the certificate by checking if the lv value 234 matches a revoked certificate's lv value, and can reject the message if the certificate 160p is revoked.

However, past certificates 160p (i.e., those associated to a time period t where $t \leq t_s$) remain protected, preserving the misbehaving device's privacy prior to the detection of the malicious activity.

Reducing Points of Collusion—LA-Free SCMS

A disadvantage of the original SCMS scheme is that it includes multiple points of collusion that could enable tracking a non-misbehaving device 110 by allowing different certificates 160p to be linked to device 110.

One collusion point is the collusion between the PCA 210 and the RA 220. In normal operation, the RA 220 does not know the contents of certificate 160p because, at step 526 (FIG. 9), the PCA 210 encrypts the certificate 160p with a public key whose corresponding private key, while computable by the corresponding vehicle 110, is unavailable to the RA 220. If the PCA 210 and RA 220 collude, however, the PCA 210 can disclose the certificate 160p contents to the RA 220, and the RA 220 can identify the vehicle or user 110 that made the original request for that certificate 160p. The user's enrollment certificate 160 can thus be identified by the RA 220. Different certificates 160p can therefore be associated to the user, and the user can be tracked by tracking these certificates.

The other collusion point is collusion among two or more LAs 230. Normally, each $LA_i$ knows the corresponding $plv_i$ values for a user 110, but not the lv values computed from the $plv_i$ values. If the LAs 230 collude, they can compute the lv values eventually placed into the certificates 160p for the user 110, so different certificates 160p belonging to the same user can be connected together.

These security problems (collusion points) do not violate SCMS's security claims, since SCMS was designed to ensure that no single entity is able to link two certificates 160p together. Nevertheless, it is desirable to reduce the number of entities that can collude for this purpose. The solution described herein does exactly that by removing the need for LAs 230 as separated entities, offloading their roles to the PCA 210 and RA 220. Besides improving security, the solution is also likely to reduce deployment costs, since the security infrastructure required for LAs becomes unnecessary.

According to some embodiments, systems and methods are provided which reduce the collusion points, for example, in SCMS. This section describes possible improvements to SCMS, but the invention is not so limited. A security model slightly more powerful than the "honest but curious" is assumed. Specifically, the system's entities can be considered "dishonest if allowed," i.e., they may engage in active attacks, subverting the protocols if this would bring them some advantage (e.g., the ability to track vehicles), but only if such misbehavior can go undetected. Therefore, for the proposed enhancements, it is discussed how possible deviations from the protocol can be detected.

Linking Certificates without Linkage Authorities

In the original SCMS design, even though a single LA 230 cannot identify the certificates belonging to a same device, it is trivial for multiple LAs 230 in collusion to do so. Because the LAs 230 are responsible for creating and storing pre-linkage values (FIGS. 7, 8), these entities can readily compute the corresponding linkage values from their combined data. Actually, the ability to easily compute the linkage values lv from the $plv_i$ values is the basis for SCMS's efficient revocation process (see e.g., FIG. 10, step 634). A possible improvement to reduce the exposure of SCMS to attack is, thus, to eliminate LAs 230 as separate entities and instead redistribute their roles to the PCA 210 and RA 220. The details on how this can be done in a secure manner are described in what follows.

The approach described herein still relies on linkage values for correlating certificates belonging to a same user, similarly to what is done in the original SCMS (FIGS. 7 and 9). Hence, it may use two linkage trees 204 analogous to the one shown in FIG. 8. For each enrollment certificate 160 and each set of time periods $t=0, \ldots \tau-1$, one of the two linkage trees 204 is generated by the PCA 210, and the other one is generated by the RA 220. For better clarity, the subscripts "PCA" and "RA" are used instead of "1" and "2," such that the plv values generated by the PCA 210 are denoted $plv_{PCA}(t,c)$, and the plv values generated by the RA 220 are denoted $plv_{RA}(t,c)$. However, just like in FIGS. 7 and 9, only the PCA 210 will know the lv values.

Figure 11A:
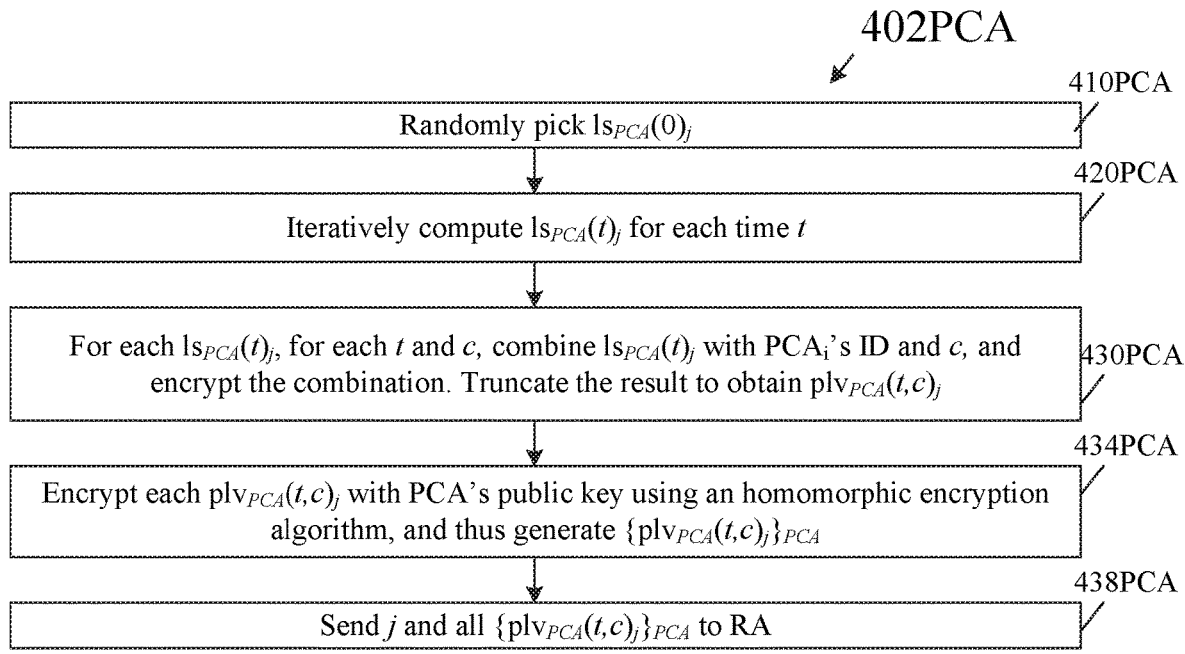
Figure 11B:
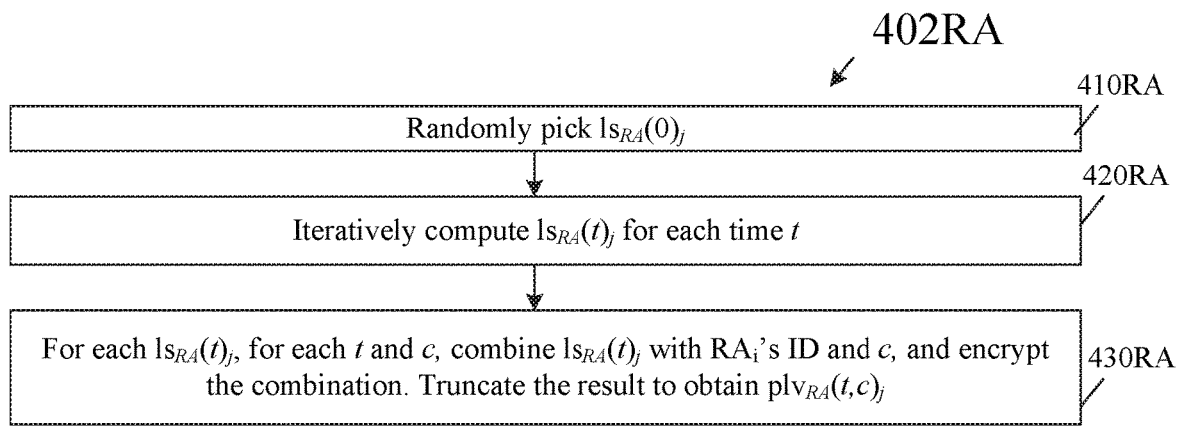
Figure 11C:
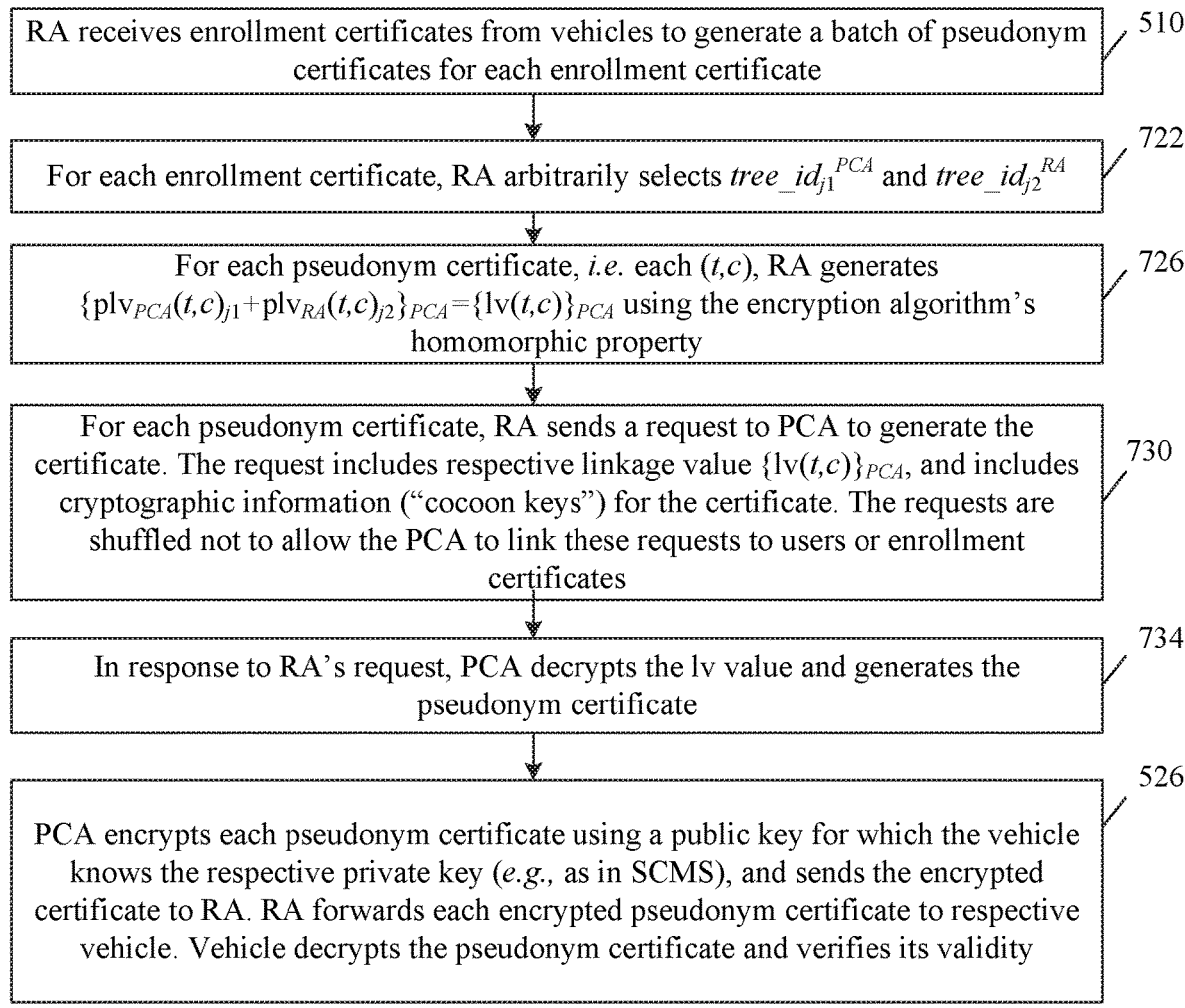

The scheme is illustrated in FIGS. 11A, 11B, and 11C. FIGS. 11A and 11B illustrate operations performed by the PCA 210 and RA 220, respectively, possibly before the earliest period t=0, and possibly before receipt, by the RA 220, of any request to generate a batch of pseudonym certificates for the relevant time periods. Each of the PCA 210 and RA 220 generates its own set of linkage trees 204. The number of trees generated by each of PCA 210 and RA 220 should be equal to, or larger than, the expected number of pseudonym certificates 160p to be generated for the times t=0, . . . τ−1. Each tree "j" is identified by some identifier tree_id$_j^{PCA}$ if generated by PCA 210, or tree_id$_j^{RA}$ generated by the RA 220. The notation "j" is used as a tree identifier, e.g., interchangeably with tree_id$_j^{RA}$ or tree_id$_j^{PCA}$.

Each tree 204 is generated based on its own, randomly chosen seed ls. In some embodiments, the tree generation processes can be modifications of process 402 of FIG. 7. The corresponding steps are shown by the suffix "PCA" or "RA": e.g., 402PCA instead of 402, etc. For each tree j, the notation ls$_{PCA}$(t)$_j$ or ls$_{RA}$(t)$_j$ is used instead of ls$_j$(t) of FIG. 8, and plv$_{PCA}$(t,c)$_j$ or plv$_{RA}$(t,c)$_j$ instead of plv$_j$(t,c).

FIG. 11A illustrates the process 402PCA performed by the PCA 210 to generate each tree j. At step 410PCA, the PCA 210 picks a random seed ls$_{PCA}$(0)$_j$ for the tree. At step 420PCA, the corresponding chain ls$_{PCA}$(t)$_j$ is computed, using possibly the same process as at step 420 of FIG. 7.

At step 430PCA, the values plv$_{PCA}$(t,c)$_j$ can be computed using the following equation (Eq. 2PCA):

$$plv_{PCA}(t,c)_j = enc(ls_{PCA}(t)_j, PCA\_id\|c), \text{for } 0 \le c < \sigma - 1 \quad \text{(Eq. 2PCA)}$$

where PCA_id is some identifier of the PCA 210. The encrypted value is truncated to a suitable size (e.g., 64 bits) to arrive at plv$_{PCA}$(t,c)$_j$, as in FIG. 7.

At step 434PCA, each pre-linkage value plv$_{PCA}$(t,c)$_j$ is encrypted by the PCA 210 with its public key, using an homomorphic encryption algorithm (e.g., the additively homomorphic Paillier cryptosystem, as described in [11] Paillier, "Public-key cryptosystems based on composite degree residuosity classes," *Advances in cryptology-EURO-CRYPT'99*. Springer, 1999, pp. 223-238, which is incorporated by reference). The encrypted pre-linkage values {plv$_{PCA}$(t,c)$_j$}$_{PCA}$ are associated to a same identifier, j or tree_id$_j^{PCA}$, unique per tree, and are sent to the RA 220 with the identifier. As a result, the RA 220 is able to recognize which set of pre-linkage values {plv$_{PCA}$(t,c)$_j$}$_{PCA}$ belong to a same linkage tree j, and also identify their corresponding indices (t,c) in that tree. But the RA 220 cannot decrypt any given plv$_{PCA}$(t,c)$_j$, so the RA 220 never learns its actual value.

Similarly FIG. 11B illustrates the process 402RA performed by the RA 220 to generate or create a set of linkage trees tree_id$_j^{RA}$, with values plv$_{RA}$(t,c)$_j$. Each tree is created by a process 402RA based on the tree's randomly chosen seed value ls$_{RA}$(0). Steps 410RA, 420RA, 430RA can be done similarly to respective steps 410PCA, 420PCA, 430PCA. At step 430RA, the following equation (Eq. 2RA) can be used:

$$plv_{RA}(t,c)_j = enc(ls_{RA}(t)_j, RA\_id\|c), \text{for } 0 \le c < \sigma - 1 \quad \text{(Eq. 2RA)}$$

In other words, RA_id can be used instead of PCA_id, where RA_id is some identifier of the RA 220.

The RA 220 stores, in its storage 150S, both the PCA's encrypted trees, and the RA's trees. The trees are indexed by their source (RA 220 or PCA 210) and identifier j, so that given the tree source and identifier j, the RA 220 can locate the corresponding tree in the RA's storage.

FIG. 11C illustrates a method or process for generating pseudonym certificates. Step 510 is the same as in FIG. 9: the RA 220 receives the enrollment certificates 160, and checks that they have not been revoked. The RA 220 does not generate any pseudonym certificates for a revoked enrollment certificate.

At step 722, for each valid enrollment certificate 160, the RA 220 selects a PCA tree tree_id$_{j1}^{PCA}$ (j1 is some index), and selects one of its own trees, tree_id$_{j2}^{RA}$ (j2 is some index). The tree selection can be arbitrary, e.g. random. The PCA 210 never learns which of its trees was selected for a given enrollment certificate.

At step 726, for each pseudonym certificate to be generated for the enrollment certificate, the RA 220 uses the homomorphic property of the encryption scheme to combine (e.g., for an additively homomorphic scheme, to add) the corresponding pre-linkage values for each (t,c) pair, obtaining a tree of encrypted linkage values:

$$\{lv(t,c)\}_{PCA} = \{plv_{PCA}(t,c)_{j1} + plv_{RA}(t,c)_{j2}\}_{PCA} \quad \text{(Eq. 4)}$$

These linkage values can only be decrypted by the PCA 210.

At step 730, the RA 220 then requests the PCA 210 to generate the pseudonym certificate. This step is similar to steps 518, 520 (FIG. 9). In particular, the requests are shuffled so that the PCA 210 cannot associate these requests to a particular device 110 or enrollment certificate 160. Each request includes the same data as at step 520 except that the linkage value (Eq. 4) replaces the pre-linkage values.

At step 734, the PCA 210 decrypts lv, and then creates and encrypts the pseudonym certificate as usual (step 526), the only difference being that lv(t,c) is retrieved directly from the RA's request, instead of being computed by XORing the pre-linkage values provided by different LAs. The PCA 210 may also sign its response with the PCA's public key. Step 526 of FIG. 11C can be the same as in FIG. 9.

As a result of this process, even though PCA 210 and RA 220 create the pre-linkage values without the intervention of any LA 230, they have no knowledge of which pre-linkage value is associated to any given certificate 160p (unless, of course, they collude). More precisely, the RA 220 does not learn any plv$_{PCA}$(t,c) received from the PCA 210, since they are random-like values encrypted with the PCA's public key; hence, the RA 220 is unable to determine lv(t,c) despite knowing the pre-linkage value plv$_{RA}$(t,c). The PCA 210, in turn, is unable to determine which plv$_{PCA}$(t,c) corresponds to a given lv(t,c) received from the RA 220, since plv$_{RA}$(t,c) acts as a random mask during the computation of lv(t,c). Therefore, assuming that the RA 220 correctly shuffled the requests, any received lv(t,c) follows a uniform distribution from the PCA's perspective. Consequently, as in the original SCMS, RA 220 only knows that a given batch of certificates belongs to a same user 110, but has no access to the batch's contents (including the linkage values enclosed in the pseudonym certificates). In comparison, the PCA 210 knows the certificates' contents, but cannot link any information in the certificate to a given user 110; for example, it is unable to correlate any lv(t,c) to its corresponding plv$_{PCA}$(t,c) and, thus, to a specific linkage tree.

Revocation Process

The revocation process, illustrated in FIG. 12, can be similar to the process in SCMS of FIG. 10. Namely, step 610 in FIG. 12 is the same as in FIG. 10: when MA 250 detects that the owner 110 of a given pseudonym certificate 160p is misbehaving, the MA 250 provides that certificate's linkage value, lv, to the PCA 210. In response, at step 814, the PCA 210 sends to the MA 250 the identifier of the request in which the certificate 160p was generated. This request was provided by the RA 220 to the PCA 210 at step 730 (FIG. 11C). At that time (during pseudonym certificate generation), upon receipt of the request and decrypting the lv value at step 734, the PCA 210 stored, in its computer storage 150S, mapping data 210M (FIG. 13A) that map the lv value to the request ID. At step 814, the PCA 210 searches its storage for the lv value, and provides the corresponding request ID to the MA 250.

The MA 250 sends the request ID to the RA 220 at step 818. In response at step 822, the RA 220 sends to the MA 250 the ID 161 (FIG. 4) of the corresponding enrollment certificate 160, and the corresponding values $plv_{RA}$, $\{plv_{PCA}\}_{PCA}$, t, c, j1, and j2 employed in that request. Specifically, at step 730 (FIG. 11C), the RA 220 stored, in its computer storage 150S, mapping data 220M (FIG. 13B) that map the request ID into a set of values including: the ID 161 of corresponding enrollment certificate 160; $plv_{RA}=plv_{RA}(t,c)_{j2}$; $\{plv_{PCA}\}_{PCA}=\{plv_{PCA}(t,c)_{j1}\}_{PCA}$; t; c; j1; j2. At step 822, the RA 220 searches its storage for the request ID, and provides the corresponding values to the MA 250.

The RA 220 also blacklists the enrollment certificate 160 using the same process as at step 622 in FIG. 10.

The RA 220 also sends to the MA 250, at step 822, any additional data that allows associated certificates to be revoked in a forward secure manner. Such data includes the linkage seed value $ls_{RA}(t_s)$ for the tree identified by $tree\_id_{j2}^{RA}$, where $t_s$ is the time period from which the certificates must be revoked. The RA 220 can compute the ls value from j2 because the RA 220 stores the linkage tree 204 (or at least the tree seed ls(0)) for each j2 and can identify the tree from j2. Alternatively, or in addition, the RA 220 can store the ls value as part of mapping data 220M associated with the request ID.

At step 826, the MA 250 sends the $\{plv_{PCA}\}_{PCA}$ value to the PCA 210 for decryption, and also sends to the PCA 210 the parameters t, c, and j1. At step 830, the PCA 210 decrypts $\{plv_{PCA}\}_{PCA}$, and provides $plv_{PCA}$ to the MA 250. The PCA 210 also provides to the MA 250 the corresponding linkage seed value $ls_{PCA}(t_s)$ for the same $t_s$ provided by the RA. The PCA 210 can identify the ls value from the tree identifier j1 because the PCA 210 can locate or compute the tree from j1 (similarly to the RA 220 being able to compute its trees from j2).

Step 634 of FIG. 12 is similar to step 634 of FIG. 10: the MA 250 and/or RA 220 place the linkage seeds $ls(t_s)$ in a CRL 238, so anyone can use them in the computation of $lv(t,c)$ for $t \geq t_s$.

When compared with the original SCMS revocation procedure, a difference in the described process is that the PCA 210 needs to be contacted twice, at steps 610 and 826: once for identifying the pseudonym certificate request (step 814), and once for the retrieval of the unencrypted value of $plv_{PCA}$ and the corresponding linkage seed. In addition, this process is designed to avoid the leakage of information between PCA 210 and RA 220, as well as to allow extra verifications by the MA 250. More precisely, if desired the MA 250 can confirm that the correct certificate is being revoked, by checking at step 830 or 634 that:

$$lv = plv_{RA} + plv_{PCA} \quad (Eq.\ 5)$$

where lv is obtained from the certificate (step 610), and the plv values are obtained from the RA 220 and the PCA 210 (steps 822 and 830). Hence, if either PCA 210 or RA 220 sends an invalid seed is to the MA 250, either due to an unintentional mistake or to malicious intent (e.g., an attempt to prevent the vehicle from being revoked), this issue can be detected. The reason is that, since the PCA 210 (respectively RA 220) does not learn the value of $plv_{RA}$ (respectively $plv_{PCA}$) in this process, providing a wrong value of $plv_{PCA}$ (respectively $plv_{RA}$) should lead to the correct lv with only negligible probability.

If equation (5) does not hold true, the MA 250 can generate an error report, including possibly an electronic log entry or a signal disabling or somehow restricting the RA 220 or the PCA 210. For example, the RA 220 and PCA 210 can be disabled and their functions could be transferred to backup systems.

Detection of Dishonest RAs by MA

In a "dishonest if allowed" threat model, one possible drawback of the proposed solution is that, in principle, it does not prevent a dishonest RA 220 from providing a bogus linkage value to the PCA 210 aiming to track devices. More precisely, suppose that at step 726 in FIG. 11C, the RA 220 does not use the (additively) homomorphic scheme to compute the encrypted lv value as in equation (Eq. 4) above; instead, the RA 220 simply encrypts an arbitrary bitstring $z(t,c)$ with the PCA's public key, and then presents the resulting ciphertext in place of the correct $lv(t,c)$. By design, the PCA 210 should be unable to distinguish a correctly computed $lv(t,c)$ from a random string, since otherwise it might also be able to identify which value of $plv_{PCA}(t,c)$ was employed in the computation of $lv(t,c)$, and thus, to associate different requests to a same user. Therefore, such trickery would end up going unnoticed by the PCA 210, and $z(t,c)$ would be used as that pseudonym certificate's linkage value. Then, it would be trivial for the RA 220, who knows every value of $z(t,c)$ and also the identities of the vehicles making each request, to link a pseudonym certificate to its owner.

Besides violating the users' privacy, such misbehavior from the RA 210 might have disastrous consequences to the system's (e.g., SCMS) revocation process. Namely, it would prevent an MA 250 from actually revoking the corresponding certificates using a single pair of linkage seeds: after all, it is very unlikely that the set of $(plv_{RA}(t,c), plv_{PCA}(t,c))$ derived from the RA's and PCA's linkage seeds would match the arbitrary $z(t,c)$ values inserted into the certificates as linkage values. Actually, except for a negligible probability, this should only happen if every $z(t,c)$ value was originally computed from a linkage seed, like $plv_{RA}(t,c)$, and then added to the corresponding $plv_{PCA}(t,c)$. This observation is taken into account in the hereby described revocation procedure, which enables the MA 250 to identify, by checking the equation (Eq. 5) above, that something is wrong when the linkage seeds provided by PCA 210 and RA 220 do not lead to the expected $lv(t,c)$. Indeed, when the RA 220 forces $lv(t,c)=z(t,c)$ aiming to track vehicles, it would only pass the $lv(t,c)=plv_{PCA}(t,c)+plv_{RA}(t,c)$ check performed by the MA 250 if: (1) the RA 220 is able to provide $z(t,c) plv_{PCA}(t,c)$ as the value of $plv_{RA}(t,c)$, as well as linkage seeds that are pre-images of such $plv_{RA}(t,c)$; or (2) $plv_{PCA}(t,c)=0$ for every t and c, in which case the RA 220 can simply compute $z(t,c)$ from a regular linkage tree and provide linkage seeds as usual. However, since RA 220 never learns the value of $plv_{PCA}$ during the pseudonym certificate issuing process, it should be unable to compute $z(t,c) plv_{PCA}(t,c)$, let alone find the corresponding pre-images; in addition, the $plv_{PCA}(t,c)=0$ condition only happens with negligible probability, since each $plv_{PCA}(t,c)$ is the output of a cryptographic algorithm (e.g., a hash function or a block cipher). Hence, it should be unfeasible for a malicious RA 220 to escape such misbehavior detection by the MA 250 whenever a certificate is revoked.

Detection of Dishonest RAs by PCA

While useful, the mechanism described above for detecting misbehavior only works at the moment of certificate revocation, which may not be enough in practice. The reason is twofold: first, honest users are not expected to be revoked, meaning that they could be inconspicuously tracked by the malicious RA 220 for the entire lifetime of their certificates; second, one main motivation for the adoption of short-lived certificates is exactly to avoid the need of revoking them, so in an actual deployment the RA's honesty may be rarely scrutinized.

To address this, in some embodiments, an auxiliary mechanism can be employed by the PCA 210 for a more frequent evaluation of an RA's behavior. Namely, without loss of generality, assume that such scrutiny should occur periodically, after a total of n pseudonym certificates cert (where 0≤i<n) are issued by the PCA 210 for the RA 220 being audited. Let us denote, for pseudonym certificate cert and the corresponding (t,c) values:

$$plv_{RA,i} = plv_{RA}(t,c)$$

$$plv_{PCA,i} = plv_{PCA}(t,c)$$

When the n pseudonym certificates have been issued, the PCA 210 requests: (1) the sum of the n pre-linkage values generated by the RA 220 for those certificates, denoted $$\theta_{RA} = \Sigma_{i=1}^{n}(plv_{RA,i}) \quad \text{(Eq. 6)}$$

and (2) the shuffled list of all encrypted $plv_{PCA,i}$ associated to those certificates (or, equivalently, a shuffled list containing the IDs tree_id$_{j2}^{PCA}$ of the corresponding PCA's linkage trees, as well as the indices (t,c) of every $plv_{PCA,i}$ in those trees). With this information, the PCA 210 sums up its own pre-linkage values $plv_{PCA,i}$ obtaining $$\theta_{PCA} = \Sigma_{i=1}^{n}(plv_{PCA,i}) \quad \text{(Eq. 7)}$$

without learning in which order each $plv_{PCA,i}$ was used by the RA 220. The PCA 210 also adds together the corresponding linkage values that were inserted in the n certificates issued during that period, obtaining $\Sigma_{i=1}^{n} lv_i$. Finally, the PCA 210 checks whether $$\theta_{RA} + \theta_{PCA} = \Sigma_{i=1}^{n}(lv_i) \quad \text{(Eq. 8)}$$

The certificates were created properly only if this equality holds true. If the equality does not hold true, the PCA 210 can generate an error report, including possibly an electronic log entry or a signal disabling or somehow restricting the RA 220. For example, the RA 220 can be disabled and its functions could be transferred to a backup system.

Similarly to the MA's verification procedure, this auxiliary auditing mechanism performed by the PCA 210 allows the latter to identify situations in which the RA 220 responds with an arbitrary $z_i$ instead of using $plv_{PCA,i}$ when computing the homomorphically encrypted linkage value $lv_i$. Specifically, such misbehavior by the RA 220 ends up forcing $lv_i = z_i$ and, thus, $\Sigma_{i=1}^{n}(z_i) = \Sigma_{i=1}^{n}(lv_i)$. Therefore, the RA 220 would only be able to escape detection if it provides in its response a value of $\theta_{RA*}$ that satisfies $\theta_{RA*} = \Sigma_{i=1}^{n}(plv_{RA,i}) + \Sigma_{i=1}^{n}(plv_{PCA,i})$. Finding such $\theta_{RA*}$ should be unfeasible, though, because the pseudonym certificate issuing process does not reveal any $plv_{PCA,i}$, nor their summation, to the RA 220. The main difference when compared with the MA's procedure is that this process prevents the PCA 210 from learning which $plv_{PCA,i}$ is associated with each certificate, so it cannot track devices either. More precisely, the PCA 210 only learns which pre-linkage values have been already used and, thus, can estimate how many vehicles have received the different cert$_i$. As long as the number of vehicles is large enough, however, this knowledge should not lead to any actual privacy issue.

Finally, it is noted that an analogous perusal by the RA 220 to verify the PCA's honesty is unnecessary, since the PCA 210 has no advantage in misbehaving during the computation of linkage values. For example, if the PCA 210 inserts an arbitrary value z(t,c) in the certificate instead of decrypting and using the lv provided by the RA 220, this would not reveal any information about the owner of the certificates. Instead, it would only needlessly disrupt the revocation process in a manner that is still detectable by the MA, similarly to what has been previously described for a misbehaving RA: when the MA verifies whether $lv(t,c) = plv_{PCA}(t,c) + plv_{RA}(t,c)$, the PCA would be unable to compute $z(t,c) - plv_{RA}(t,c)$ and, thus, would fail this test with overwhelming probability.

Temporary Revocation of Certificates

Another limitation of the original SCMS scheme is that its efficient revocation process focus is on the permanent revocation of a device 110 (via the inclusion of linkage seeds in the CRL) or on the revocation of a single pseudonym certificate (if only its linkage value lv is published); the latter is of little interest, though, because other certificates from the same time period would remain valid, so the device would not actually be revoked.

According to some embodiments, systems and methods are provided which give, with minimal overhead, support to two additional use cases: (1) the temporary revocation of a device, corresponding to a suspension; and (2) the linkage of devices for a limited period of time, which is useful, for example, when aiding in investigations by law enforcement authorities.

Besides adding this functionality, the proposed solution also addresses a security issue of the original SCMS revocation procedure, which is prone to attacks that build upon the birthday paradox to degrade the system's security over time, allowing the recovery of linkage seeds that have not been placed in CRLs. This issue appears both during the computation of linkage seeds and of pre-linkage values derived from them, as explained below. To address such attacks, according to some embodiments, systems and methods are provided for a more secure way of building the tree that correlates linkage seeds and pre-linkage values.

Birthday Attacks Against Pre-Linkage Values

In SCMS, multiple pre-linkage values are computed via the encryption of a same plaintext, under different k-bit long keys. Namely, for all users, the c-th pre-linkage value valid in a given time period t, $plv_i(t,c)$, is computed by $LA_i$ as $enc(ls_i(t), la\_id_i \| c)$, using the linkage seed $ls_i(t)$ as encryption key. This procedure allows the construction of a key recovery attack typical of a multi-key setting, as described in Biham, "How to decrypt or even substitute DES-encrypted messages in 228 steps," *Inf. Process. Lett.*, vol. 84, no. 3, pp. 117-124, November 2002, and Mouha et al., "Multi-key security: The Even-Mansour construction revisited," in *Advances in Cryptology—CRYPTO 2015: 35th Annual Cryptology Conference*, Berlin, Heidelberg: Springer Berlin Heidelberg, 2015, pp. 209-223 (both incorporated herein by reference), as follows. First, the attacker picks $2^n$ distinct keys $ls_i^j$, where $0 \le j < 2^n$. Then, the attacker performs $2^n$ encryptions to build a table of the form $\{plv_i^j, ls_i^j\}$, where $plv_i^j = enc(ls_i^j, la\_id_i \| c)$ for a target la_id$_i$; and a fixed $0 \le c < \sigma$. According to the birthday paradox, if the attacker can gather a total of $2^m$ pre-linkage values computed by $LA_i$ for a same index c, at least one of those pre-linkage values will match a $plv_i^j$ in the attacker's table with a high probability as long as m+n≥k, as further described in Biham, "How to decrypt or even substitute DES-encrypted messages in 228 steps," *Inf. Process. Lett.*, vol. 84, no. 3, pp. 117-124, November 2002, incorporated by reference. Except in the very unlikely case of equivalent keys, whenever there is a match for $\{plv_i^j, ls_i^j\}$, it is safe to assume that $ls_i^j$ corresponds to the linkage seed employed for the computation of that pre-linkage value.

Since the $2^m$ pre-linkage values employed in the attack can refer to different devices and time periods, as long as they receive the same index in that time period and come from a same $LA_i$, the security of the system for a given choice of k degrades as time passes and $LA_i$ serves more devices. In practice, this may end up limiting the lifespan of LAs 230, especially considering that the recovery of a given $ls_i(t_s)$ allows the computation of any subsequent $ls_i(t)$ for $>t_s$. Therefore, the effects of such key-recovery could be quite serious to the affected device's privacy.

SCMS is not completely defenseless against this attack, for at least two reasons. The first is that, by design, only the PCA 210 has access to the raw pre-linkage values not included in CRLs, whereas the device's certificates contain only linkage values (i.e., the XOR of two or more prelinkage values). Hence, even though the PCA 210 is able to perform the aforementioned attacks, external entities are in principle prevented from doing so. The second is that the cipher's output is actually truncated for the computation of $plv_i(t,c)$ (e.g., using the 8 most significant bytes of AES). This should produce many partial matches on the attacker's table, leading to multiple candidates for the correct linkage seed $ls_i(t)$. Nevertheless, these candidates could still be filtered with a certain probability if the attacker has access to additional pre-linkage values related to the same linkage seed. For example, from $plv_i(t,c)$ and $plv_i(t+1, c)$, the attacker obtains, respectively, one set of candidates for $ls_i(t)$ and one for $ls_i(t+1)$; incorrect candidates can then be filtered out if they do not satisfy $ls_i(t+1)$=hash(la_id$_i$||$ls_i(t)$). Alternatively, if the pre-linkage values obtained are $plv_i(t,c)$ and $plv_i(t, c')$, with $c'\neq c$, two tables can be built: one of the form {enc($ls_i^j$, la_id$_i$||c),$ls_i^j$} and the other of the form {enc($ls_i^j$, la_id$_i$||c'), $ls_i^j$}, for the same group of $2^n$ keys $ls_i^j$; each table will lead to a different set of candidates for $ls_i(t)$, and candidates not appearing in both sets can be eliminated.

Birthday Attacks Against Linkage Seeds:

A second attack that can be perpetrated against SCMS, aimed specifically at its forward privacy property, relies on the fact that the k-bit long linkage seeds are computed via iterative hashing, using a fixed prefix for each LA, i.e., $ls_i(t)$=hash(la_id$_i$||$ls_i(t-1)$). More precisely, to discover $ls_i$ ($t<t_s$) from a given $ls_i(t_s)$ placed in a CRL 238, an attacker can proceed as follows. First, the attacker picks $2^n$ random values $ls_i(t_s)$, where n is a chosen parameter and $0 \leq \alpha < 2^n/\tau$. Each $lc_{i,\alpha}(0)$ is then used as the anchor for a hash chain of the form $lc_{i,\alpha}(j)$=hash(la_id$_i$||$lc_{i,\alpha}(j-1)$), where $1 \leq j < \tau'$ and $\tau'$ is the length arbitrarily chosen by the attacker for the chains. For example, the attacker could set $\tau'$=w·$\tau$ for a small w, so the created chains' length would be close to the length of hash chains from the target $LA_i$. that all $lc_{i,\alpha}(j)$ computed in this manner are distinct for any j and $\alpha$, i.e., that no collisions occur; in this case, the attacker obtains $2^n$ hash chains at the cost of $ \tau'·2^n$ hash computations. In practice, though, collisions could be handled simply by merging the corresponding hash chains, so the total number of chains would be smaller and some of them would be longer than others.

Once again due to the birthday paradox, an attacker that gathers $2^m$ linkage seeds computed by $LA_i$ has a high probability to find a match between at least one of those linkage seeds and some previously computed $lc_{i,\alpha}(j)$ if m+n+lg($\tau'$)≥k. If a match occurs for $ls_i(t_s)$ and $lc_{i,\alpha}(j)$, then a previous linkage seed $ls_i(t_s-\in)$ will also match $lc_{i,\alpha}(j-\in)$. Assuming $lc_{i,\alpha}(j-\in)$ is actually the pre-image of $ls_i(t_s-\in+1)$, and not a second preimage, this would allow the attacker to associate non-revoked certificates to a same device and, thus, violate the system's forward privacy.

This attack can be performed both by internal and external entities, using pre-computed hash-chains for selected LAs 230; after all, it requires only access to linkage seeds from (public) CRLs and the LAs' identifiers. Since the $2^m$ linkage seeds employed for this purpose can refer to any device and time period, once again the system's security degrades as time passes and certificates from devices served by a same $LA_i$ are included in CRLs. Therefore, for security reasons, the lifespan of a given $LA_i$ may become limited by the choice of k and by the number of devices revoked with the participation of $LA_i$.

Linkage Tree Supporting Temporary Linkage/Revocation of Pseudonym Certificates

In its original form, SCMS only provides efficient mechanisms for the permanent revocation of users, via the disclosure of the linkage seed for a given time period $t_s$. This can be seen in FIG. 8, which shows a graphical representation of the dependencies between linkage seeds and pre-linkage values. As indicated by the directed arrows, the disclosure of linkage value $ls_i(t_s)$, allows anyone to compute the pre-linkage values associated to it, $plv_i(t_s,•)$, as well as linkage values for subsequent time periods and their corresponding pre-linkage values. Nevertheless, in some situations it is important that a small set of messages exchanged among vehicles can be traced to their origin. For example, when handling traffic accidents, the messages sent by the vehicles involved in the event may be useful for law enforcement authorities, so they can understand its causes (and, possibly, identify culprits), as described in more detail in Moalla et al. Similarly, a hijacked car might have its privacy temporarily suspended, aiming to allow nearby vehicles and roadside units to identify all messages originating from it and, thus, track its movement. For performance reasons, this temporary tracking should be possible by means of a single CRL-like entry.

A More Flexible Revocation Process: Linkage Hooks

Figure 14:
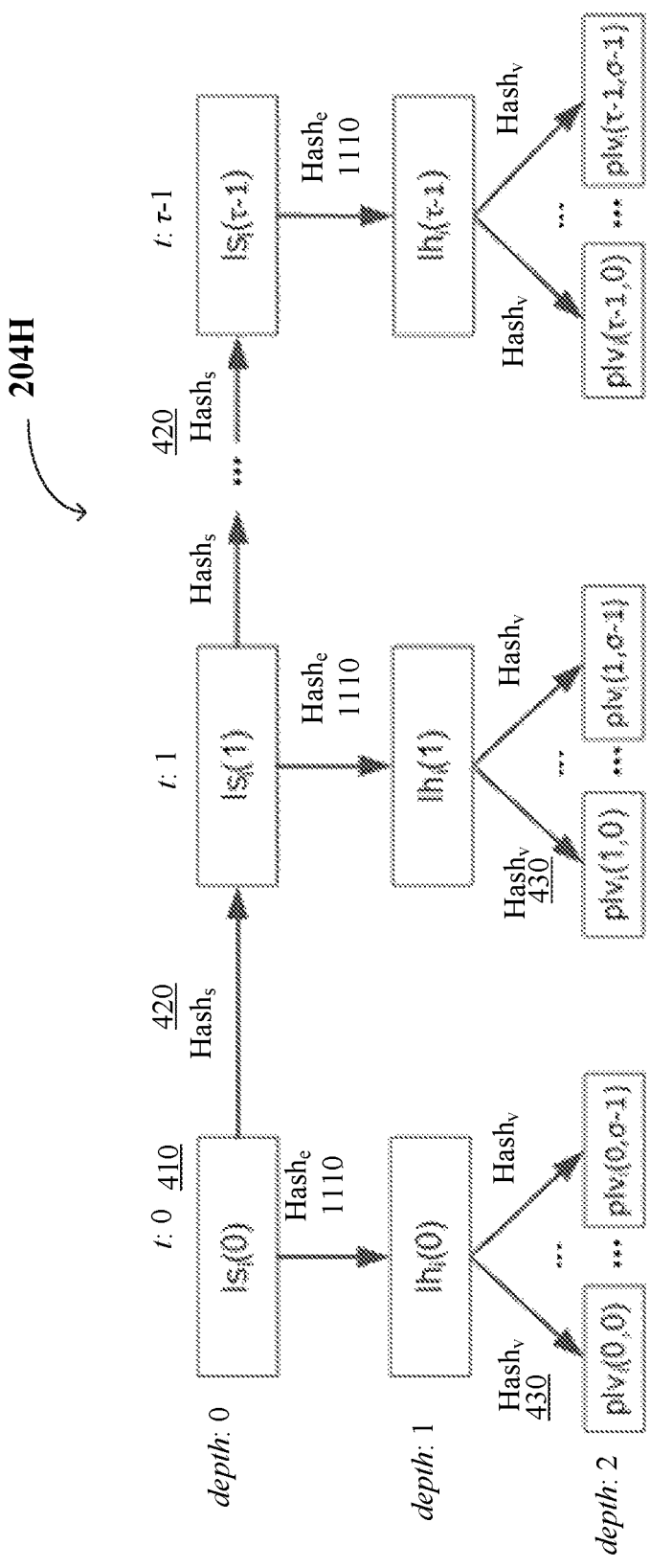

To provide more flexibility to the revocation process, while still maintaining its overall structure, according to some embodiments, a different linkage tree is provided. FIG. 14 illustrates such a linkage tree 204H. Linkage tree 204H includes an extra link to the dependence tree, with the insertion of a linkage hook $lh_i(t)$ between any linkage seed $ls_1(t)$ and its corresponding pre-linkage values $plv_1(t,•)$. As a result, the disclosure of $lh_i(t_s)$ allows the recovery of every $plv_i(t_s,•)$, but still protects all $plv_i(t,•)$ for $t \neq t_s$, thus granting the system (e.g., SCMS) the ability to link and/or revoke all certificates of a time period $t_s$ without affecting the privacy of any other time period.

Figure 15:
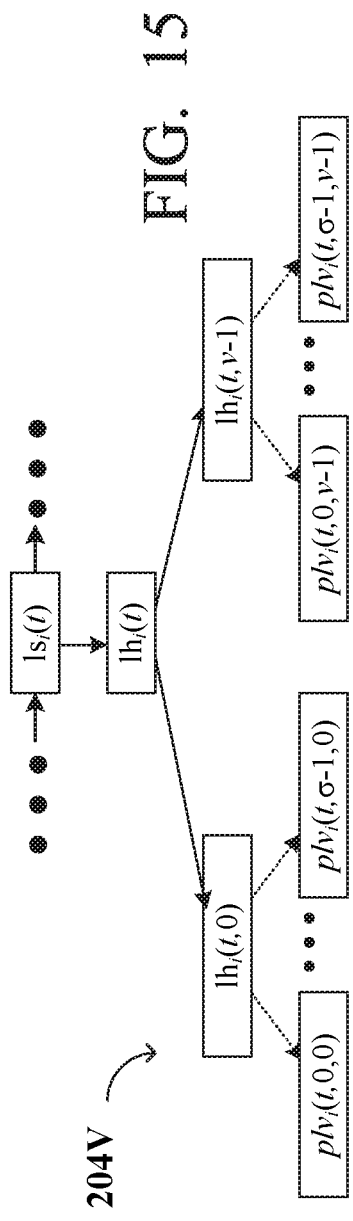

This concept could be further extended. FIG. 15 illustrates a linkage tree 204V for use cases in which only a part of the certificates from a given time period need to be linked/revoked. Suppose, for example, that the system's certificates 160$p$ must have v different purposes, so they display distinct "key usage" fields (like in regular X.509 certificates, as described in Cooper et al., "RFC 5280—Internet X.509 Public Key Infrastructure Certificate and Certificate Revocation List (CRL) profile," RFC 5280—https://tools.ietf.org/html/rfc5280#section-4.2. 1.3, May 2008, which is incorporated by reference) even though they share the same validity period t. This feature might be the useful, e.g., for protecting the identity of official vehicles: whenever they do not need (or want) to be identified, they could use their regular pseudonym certificates, identical to those issued to other vehicles; however, when they need to prove their status as official vehicles (e.g., aiming to get traffic priority), they would sign their messages with special-purpose certificates.

In this scenario, one possible approach for allowing the independent revocation/linkage of such different-purpose certificates is to create distinct linkage trees, one for each key usage. Then, the certificates sharing the same purpose could be revoked altogether as usual, by inserting linkage hooks (for temporary revocation) or seeds (for a permanent revocation) in a CRL. However, revoking all certificates belonging to a vehicle would lead to v times more data placed in CRLs. Conversely, a more efficient revocation can be obtained by adding one extra level $lh(t,d)$ to the dependence tree, where $d=0, 1, \ldots v-1$. The result is that $lh_i(t)$ would link the multiple $lh_i(t, 0) \ldots lh_i(t, v-1)$. Hence, if all certificates 160P for a given time period t need to be linked/revoked, then $lh_i(t)$ would be disclosed as in FIG. 14. If, however, only certificates of a certain type d needed to be linked/revoked for time $t_s$, then the disclosure of the corresponding linkage hooks $lh_i(t_s,d)$ would suffice.

In some embodiments, the linkage trees of FIGS. 14 and 15 can be used in a system with or without LAs 230. The linkage trees can be generated by the LAs 230, or by the PCA 210 and RA 220. FIG. 16 illustrates a process 402H for generating a linkage tree 204H. This process can be performed by the LAs or the PCA and the RA instead of the process 402 (FIG. 7), 402PCA (FIG. 11A), or 402RA (FIG. 11B).

Specifically, step 410 of process 402H is as in process 402, 402PCA, or 402RA: a linkage seed $ls_{src}(0)$ is randomly picked, where "src" indicates the entity generating the tree: $ls_{src}=ls_i$ if the tree is generated by $LA_i$; $ls_{src}$ is $ls_{PCA}$ or $ls_{RA}$ if the tree is generated by the PCA or RA respectively.

At step 420, the values $ls_{src}(t)$ are computed for all t using a hash function $Hash_s$, possibly as in original SCMS. This step can be the same as in process 402, 402PCA, or 402RA.

At step 1110, the hooks $lh_{src}(t)$ are computed for all t, using some hash function $Hash_e$, which may or may not be the same as $Hash_s$.

Step 430 can be similar to standard SCMS: $plv_{src}(t,c)$ are computed using a hash function shown as $Hash_v$, which may or may not be the same as $Hash_e$ or $Hash_s$. For each $plv_{src}(t,c)$, the hash function is applied to a concatenation of the hook $lh_{src}(t)$ with some value depending on c and on the tree generation entity ID (src_id), i.e., la_id$_i$ or PCA_id or RA_id. See for example equations (Eq. 2), (Eq. 2PCA), (Eq. 2RA) above.

Any hash function can be implemented using as basis an encryption algorithm, as known in the art. See for example equations (Eq. 2), (Eq. 2PCA), (Eq. 2RA).

In case of trees 204V, the tree generation is similar. Steps 410, 420, 1110 can be as in FIG. 16. Then from each hook $lh_{src}(t)$, the hooks $lh_{src}(t,d)$ are generated as the outputs of a hash function applied to a value depending on d and src_id. For example, a concatenation d||src_id can be used.

Then step 430 is performed as in FIG. 16, except that the values $lh_{src}(t,d)$ are used instead of $lh_{src}(t)$, and the resulting plv values are $plv_{src}(t,c,d)$.

The pseudonym certificate generation can be as described above. Specifically, if the LAs 230 are used, the process can be as in FIG. 9, but step 516 is modified by replacing the process 402 by process 402H to generate the $plv_i$ values. Similarly, if tree 204V is used, then the values $plv_i(t,c,d)$ are generated at step 516 as described above.

In LA-free embodiments, the process of FIG. 11C can be used to generate the pseudonym certificates. (In case of trees 204V, referring to steps 726 and 730, the plv and lv values will depend on d in addition to t and c.)

Certificate revocation can be performed as follows. The MA 250 receives, together with the misbehaving certificate 160p or its lv value, a revocation parameter specifying whether the certificate revocation is to be performed permanently or for specific time period(s) t, and/or for certificates of all types or only specific certificate types d (in case of trees 204V). A revocation parameter may take any form; for example, it may be a piece of digital data, but there may also be a "default" parameter value presumed when no actual parameter data is received.

If LAs 230 are used, a process similar to the one shown in FIG. 10 can be performed, using the data illustrated in FIG. 17. The revocation parameter is provided to the RA 220. At step 614, the PCA 210 uses its mapping data 210M to determine the corresponding request ID (provided by the RA at step 520 of FIG. 9) and the $plv_i$ values from the lv value received from the MA 250 at step 610. The mapping data were created by the PCA 210 at step 522 (FIG. 9).

If the enrollment certificate 160 is to be permanently revoked (as specified by the revocation parameter), step 622 can be performed. At step 622, the RA 220 uses its mapping data 220M (FIG. 17) to map the request ID into some identification of the corresponding device 110 or certificate 160, e.g., certificate ID 161 (FIG. 4). Mapping data 220M is created by the RA 220 at step 520. At step 622, the RA 220 causes the certificate 160 or its ID 161 to be inserted into a CRL, and other blacklisting processes are performed as needed as described above in connection with FIG. 10.

However, step 622 can be omitted if only temporary revocation, or revocation for only specific certificate types, is desired. The enrollment certificate 160 is not necessarily blacklisted.

Step 626 is performed as in original SCMS. The RA's mapping data 220M also provides, for the request ID, the corresponding t and c values (and the d value in case of tree 204V). The RA 220 sends, to each LA the corresponding $plv_i$ value received at step 614, and the t and c values (and the d value in case of tree 204V).

The RA 220 also sends, to each $LA_i$ the aforementioned revocation parameter received from the MA 250, specifying whether the revocation is to be performed permanently or for specific time period(s) t, and/or specific certificate types d (in case of trees 204V).

At step 630, each $LA_i$ provides to the RA 220 the corresponding linkage seed $ls_i(t_s)$ if permanent revocation is to be performed (for all t starting with $t_s$). If only the revocation for one or more specific periods t is to be performed, the LA 230 does not provide the linkage seed is to the RA 220 but provides the corresponding linkage hooks $lh_i(t)$. In case of tree 204V, if the revocation is to cover only one or more times t and specific certificate types d, the $LA_i$ sends to the RA 220 only the corresponding values $lh_i(t,d)$.

To accomplish such operations, each $LA_i$ stores, at step 516, mapping data 230M in its storage. Mapping data 230M map the $plv_i$, t, and c values (and the d value if applicable) into the corresponding seed $ls_i(t)$, hook $lh_i(t)$, and in case of tree 210V also into hook $lh_i(t,d)$.

At step 634, the MA 250 distributes the values provided by the LAs 230, allowing computation of the lv values of the revoked pseudonym certificates 160p.

In the LA-free case, the certificate revocation is similar to that of FIG. 12, with the following modifications. At step 610, the MA 250 receives, together with the misbehaving certificate 160p or its lv value, a revocation parameter specifying whether the certificate revocation is to be performed permanently or for specific time period(s) t, and/or for certificates of all types or only specific certificate types d (in case of trees 204V). The MA 250 sends the revocation parameter to the RA 220 and the PCA 210.

At step 822, the RA 220 sends to the MA 250 the enrollment certificate ID 161 and the value $ls_{RA}(t)$ if permanent certificate revocation is to be performed as indicated by the revocation parameter. If however, based on the revocation parameter, revocation is to be performed only for one or more isolated time periods t and, in case of tree 204V, one or more specific types d, then the RA 220 does not need to send the ID 161 and $ls_{RA}(t)$ to the MA 250, but sends only the corresponding hooks $lh_{RA}(t)$, or, in case of tree 204V, only the corresponding values $lh_{RA}(t,d)$ and the value d. Mapping data 220M (FIG. 13B) map the request ID into the values to be sent by the RA 220 to the MA 250. The mapping data are created by the RA 220 at step 730 (FIG. 11C).

Throughout the process of FIG. 12, the $ls_{RA}(t)$ and $ls_{PCA}(t)$ values corresponding to the revoked certificates are replaced with the hook values, $lh_{RA}(t)$ and $lh_{PCA}(t)$, or $lh_{RA}(t,d)$ and $lh_{PCA}(t,d)$, as appropriate based on the revocation parameter, to accomplish certificate revocation only for selected period(s) t and/or d. See for example steps 830 and 634.

Protecting Linkage Trees Against Birthday Attacks: Security Strings

Besides this structural change, for better security the proposed approach employs a slightly different process for the derivation of pre-linkage values. Namely, instead of using a block cipher, the computation of linkage seeds, linkage hooks and pre-linkage values relies simply on hash functions whose inputs include a "security string," i.e., a different suffix for each hash function invocation. The advantage of such security strings is that they limit the attackers' ability to use the birthday paradox in their favor, effectively thwarting attacks such as those described above.

In some embodiments, a security string I can be built to take into account the tree-like structure shown in FIG. 14, so each node receives a different value of I based on the tree identifier and on its location inside the tree. For this purpose, the fields shown in Table II can be employed, leading to I=src_id∥tree_id∥t∥count∥depth, where src_id is the identifier of the entity who generated the linkage tree (e.g., an LA, PCA or RA).

TABLE II

Components of the security string employed in eSCMS

| Field | Suggested length (bits) | Description |
|---|---|---|
| depth | 8 | Node's depth in tree (all linkage seeds are at depth 0, as shown in FIG. 14) |
| count | 8 | Node's index in the time period and depth (starting at 0, as shown in FIG. 14) |
| t | 24 | Time period to which the node is associated |
| tree_id | 40 | Tree identifier (unique per tree of a same LA) |
| la_id | 16 | LA's identifier |

In a scenario in which the LAs employ this security string, the linkage seeds, linkage hooks and pre-linkage values are computed by LA, as follows:

Linkage seeds: $ls_1(0)$ is picked at random, and $$ls_i(t) = \text{hash}(ls_i(t-1), la\_id, \text{tree\_id}, t-1, 0, 0) \quad \text{(Eq. 1')}$$

Linkage hooks:

$$lh_i(t) = \text{hash}(ls_i(t), la\_id, \text{tree\_id}, t, 0, 1) \quad \text{(Eq. 9)}$$

Pre-linkage values:

$$plv_i(t,c) = \text{hash}(lh_i(t), la\_id, \text{tree\_id}, t, c, 2) \quad \text{(Eq. 10)}$$

In the case of tree 204V:

$$lh_i(t,d) = \text{hash}(lh_i(t), la\_id, \text{tree\_id}, t, d, 3) \quad \text{(Eq. 9')}$$

$$plv_i(t,c,d) = \text{hash}(lh_i(t,d), la\_id, \text{tree\_id}, t, c, d, 4) \quad \text{(Eq. 10')}$$

In some embodiments, the LAs 230 are not used; the linkage trees with hooks are generated by the RA 220 and PCA 210 similarly in FIGS. 11A, 11B, 11C, but using the equations (Eq. 1'), (Eq. 9), (Eq. 10) for trees 204H; or the equations (Eq. 1'), (Eq. 9'), (Eq. 10') for trees 204V. In these equations, la_id is replaced by PCA_id or RA_id for trees generated by the PCA or RA respectively.

Security and Performance Analysis

The linkage hooks, according to some embodiments, defeats or reduces the threat of birthday attacks as follows. First, the attacker builds a large table of the form $\{h^j=\text{hash}(str^j, I), str^j\}$ for a fixed security string I and arbitrary k-long bit strings $str^j$, where $0 \leq j < 2^n$ for some n. Then, if some k-long linkage seed $ls_i(t)$ matches $h^j$, the attacker is able to recover the corresponding pre-image $str^j$, which should correspond to $ls_i(t-1)$ with high probability. A similar reasoning applies if the match occurs for a linkage hook $lh_i(t)$ or for a pre-linkage value $plv_i(t,c)$, whose preimages reveal, respectively, $ls_i(t)$ and $lh_i(t)$. Like before, the birthday paradox dictates that finding at least one match with high probability requires $2^m$ tests for $m+n \geq k$. Since I is used only once in the system, however, the attacker can only perform one test per I, meaning that the attack would work in practice only for $n \approx k$. If k is chosen appropriately (e.g., k=128), the construction of such table with $2^k$ entries becomes computationally unfeasible. In addition, if the value of tree_id is unpredictable by attackers, they would not be able to pre-compute (parts of) such look-up table before one node in the corresponding tree is revoked; in this case, tree_id provides additional security similarly to what is done by salts in the context of password hashing (see e.g., Andrade et al., "Lyra2: efficient password hashing with high security against time-memory trade-offs," *IEEE Transactions on Computers*, vol. 65, no. 10, pp. 3096-3108, 2016, see also: http://eprint.iacr.org/2015/136, which is incorporated by reference).

It is noted that the proposed approach incurs only a small overhead when compared to the original SCMS scheme. Specifically, the flexibility introduced by linkage hooks leads to a single extra hash function call for verifying, in a given time period, whether a device's certificates were permanently revoked. In comparison, checking whether a certificate was temporarily revoked in SCMS takes as much effort as verifying if it is (permanently) revoked in SCMS. The addition of a security string I, in turn, has little impact on processing as long as its input fits the hash function's block size. SHA-256, for example, operates on 512-bit blocks; therefore, a single call to its underlying compression function is enough to process 128-bit linkage seeds, linkage hooks and pre-linkage values even when they are combined with a 384-bit security string. Since the security strings need to be published on the CRLs together with the corresponding linkage seeds or linkage hooks, however, their lengths should be limited to avoid unnecessary transmission overheads. This is the reasoning behind the 96-bit long values suggested in Table II. Nevertheless, smaller or larger security strings may be preferable in practice, depending on the expected number of LAs.

The invention is not limited to the embodiments described above. For example, the invention is not limited to any cocoon-key scheme. Some embodiments use a key scheme described in U.S. provisional patent application No. 62/575, 514, filed 22 Oct. 2017, incorporated herein by reference. See also Marcos A. Simplicio Jr. et al., "The Unified Butterfly Effect: Efficient Security Credential Management System for Vehicular Communications", Cryptology ePrint Archive: Report 2018/089, https://eprint.iacr.org/2018/089 (Abstract), https://eprint.iacr.org/2018/089.pdf (full text), both incorporated herein by reference. Further, SCMS uses elliptic key cryptography, but the invention is not limited to any particular cryptosystem.

Addition operations can be replaced by XOR or other operations.

The LA-free embodiments are not limited to additive homomorphic encryption (Eq. 4); non-additive (e.g., multiplicative) homomorphic encryption can be used instead.

In addition to the methods described above, the invention includes computing and communication entities configured to perform any part or whole of any method described above, and parts of such entities. For example, an entity can be as in FIG. 2, including one or more computer processors executing computer instructions stored in storage 150S. The invention includes storage 150S, or other computer readable medium, with data structures such as mapping data 210M, 220M, etc. described above, or parts thereof, and/or with computer instructions for computer processor(s) to perform any part or whole of any method described above. The invention includes the data structures and the instructions, and transmission (via a network or otherwise) or any such data and/or instructions.

Some embodiments include pseudonym certificate use for vehicles (including watercraft, aircraft, and spacecraft), non-vehicle mobile systems (e.g., mobile phones), and other applications. Other embodiments and variations are within the scope of the invention, as defined by the appended claims.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for managing digital certificates by entities operable to perform computing on digital values and to communicate with each other, each digital certificate comprising a corresponding linkage value linkable to linkage values of one or more other digital certificates to define one or more groups of digital certificates, the method comprising performing the following operations to generate the digital certificates:

generating, by a first entity, first pre-linkage values;

receiving, by the first entity, encrypted second pre-linkage values from a second entity, wherein at least one of first pre-linkage values and the second pre-linkage values are encrypted using homomorphic encryption, wherein each encrypted second pre-linkage value is not decryptable by the first entity;

for each digital certificate:

selecting, by the first entity, a first pre-linkage value and an encrypted second pre-linkage value;

combining, by the first entity, the selected first pre-linkage value with the selected encrypted second pre-linkage value without decrypting the second pre-linkage value, to obtain an encrypted combined value, the encrypted combined value being decryptable by the second entity but not the first entity; and sending, by the first entity to the second entity, a certificate generation request comprising the encrypted combined value;

wherein the second entity performs verification operations on consecutive groups of n certificate generation requests received from the first entity, where n is greater than one, wherein for each group of n certificate generation requests, performing the verification operation comprises:

(a) receiving from the first entity a list of the encrypted second pre-linkage values for the group without an indication which of the encrypted second pre-linkage values corresponds to any given certificate generation request;

(b) receiving from the first entity an output of a computation performed on the first pre-linkage values for the group, the output not disclosing which of the first pre-linkage values corresponds to any given certificate generation request; and (c) matching the combined values for the group with the values received in (a) and (b).

2. The method of claim 1, further comprising performing, by the second entity, operations of:

receiving the certificate generation requests;

for each certificate generation request:

decrypting the corresponding encrypted combined value; and creating the corresponding digital certificate with a linkage value obtained from the corresponding encrypted combined value.

3. The method of claim 1, wherein:

(d) if there is no match in (c), then generating an error report.

4. The method of claim 1, wherein for each combined value, the second entity does not know which second pre-linkage value was selected by the first entity for the combined value.

5. The method of claim 1, further comprising:

receiving, by the first entity, an identification of a certificate generation request corresponding to a first digital certificate which is a member of a group to be revoked;

in response to the certificate generation request, determining, by the first entity:

a first group-linking value from which the first pre-linkage values corresponding to the digital certificates in the group are computable; and second group-linking data allowing the second computer entity to determine a second group-linking value from which the second pre-linkage values corresponding to the digital certificates in the group are computable;

determining the second group-linking value by the second entity from the second group-linking data;

revoking the digital certificates in the group by making available, to potential verifiers of validity of the digital certificates, the first and second group-linking values, and/or the first and second pre-linkage values corresponding to the digital certificates in the group, to allow the potential verifiers to match a linkage value of any digital certificate against the linkage values of the digital certificates in the group.

6. The method of claim 5, wherein the certificate generation request received by the first entity is determined by the second entity based on the linkage value of the first digital certificate.

7. The method of claim 6 wherein:
each digital certificate is associate with a validity time period which is a time period when the certificate is valid;
the first entity receives an indication of one or more validity time periods for the group to be revoked, the group being limited to certificates valid in the one or more validity time periods; and
the first and second group-linking values correspond to the indication of the one or more time periods.

8. The method of claim 1 wherein:
the digital certificates are generated in response to the first entity receiving one or more user requests, each user request being a request to generate a batch of digital certificates for a respective user for a plurality of time periods, each batch including, for each time period, a plurality of digital certificates valid in the time period;
wherein each digital certificate is not trackable to the respective user without secret information available to the first entity;
wherein the second entity does not receive the secret information m generating the certificates;
wherein the method further comprises, for each digital certificate generated by the second entity, the first entity receiving, from the second entity, a message comprising the digital certificate encrypted by the second entity, wherein each encrypted digital certificate is not decryptable by the first entity, and the first entity sending the message to the respective user, the user being able to decrypt the digital certificate upon receipt of the message.

9. The method of claim 1, wherein combining the selected first pre-linkage value with the selected encrypted second pre-linkage value comprises using a homomorphic property.

10. A method for managing digital certificates by entities operable to perform computing on digital values and to communicate with each other, each digital certificate comprising a corresponding linkage value linkable to linkage values of one or more other digital certificates to define one or more groups of digital certificates, the method comprising performing the following operations to generate the digital certificates:
generating, by a first entity, first pre-linkage values;
receiving, by the first entity, encrypted second pre-linkage values from a second entity, wherein at least one of first pre-linkage values and the second pre-linkage values are encrypted using homomorphic encryption, wherein each encrypted second pre-linkage value is not decryptable by the first entity;
for each digital certificate:
selecting, by the first entity, a first pre-linkage value and an encrypted second pre-linkage value;
combining, by the first entity, the selected first pre-linkage value with the selected encrypted second pre-linkage value without decrypting the second pre-linkage value, to obtain an encrypted combined value, the encrypted combined value being decryptable by the second entity but not the first entity;
sending, by the first entity to the second entity, a certificate generation request comprising the encrypted combined value; and receiving, by the first entity, an identification of a certificate generation request corresponding to a first digital certificate which is a member of a group to be revoked;
in response to the certificate generation request, determining, by the first entity:
a first group-linking value from which the first pre-linkage values corresponding to the digital certificates in the group are computable; and
second group-linking data allowing the second computer entity to determine a second group-linking value from which the second pre-linkage values corresponding to the digital certificates in the group are computable;
determining the second group-linking value by the second entity from the second group-linking data;
verifying whether the first and second group-linking values match the linkage value of the first digital certificate;
if the verifying is successful, then revoking the digital certificates in the group by making available, to potential verifiers of validity of the digital certificates, the first and second group-linking values, and/or the first and second pre-linkage values corresponding to the digital certificates in the group, to allow the potential verifiers to match a linkage value of any digital certificate against the linkage values of the digital certificates in the group;
if the verifying fails, then generating an error report.

11. A method for managing digital certificates by entities operable to perform computing on digital values and to communicate with each other, each digital certificate comprising a corresponding linkage value linkable to linkage values of one or more other digital certificates to define one or more groups of digital certificates, the method comprising performing the following operations to generate the digital certificates:
generating, by a first entity, first pre-linkage values;
receiving, by the first entity, encrypted second pre-linkage values from a second entity, wherein at least one of first pre-linkage values and the second pre-linkage values are encrypted using homomorphic encryption, wherein each encrypted second pre-linkage value is not decryptable by the first entity;
for each digital certificate:
selecting, by the first entity, a first pre-linkage value and an encrypted second pre-linkage value;
combining, by the first entity, the selected first pre-linkage value with the selected encrypted second pre-linkage value without decrypting the second pre-linkage value, to obtain an encrypted combined value, the encrypted combined value being decryptable by the second entity but not the first entity;
sending, by the first entity to the second entity, a certificate generation request comprising the encrypted combined value;
receiving, by the first entity, an identification of a certificate generation request corresponding to a first digital certificate which is a member of a group to be revoked;
in response to the certificate generation request, determining, by the first entity:
a first group-linking value from which the first pre-linkage values corresponding to the digital certificates in the group are computable; and
second group-linking data allowing the second computer entity to determine a second group-linking value from which the second pre-linkage values corresponding to the digital certificates in the group are computable;

determining the second group-linking value by the second entity from the second group-linking data;

revoking the digital certificates in the group by making available, to potential verifiers of validity of the digital certificates, the first and second group-linking values, and/or the first and second pre-linkage values corresponding to the digital certificates in the group, to allow the potential verifiers to match a linkage value of any digital certificate against the linkage values of the digital certificates in the group;

wherein the certificate generation request received by the first entity is determined by the second entity based on the linkage value of the first digital certificate;

wherein:

each digital certificate is associated with a type;

the first entity receives an indication of one or more types for the group to be revoked, the group being limited to certificates associated with the one or more types; and the first and second group-linking values correspond to the indication of the one or more types.

12. A method for managing digital certificates by entities operable to perform computing on digital values and to communicate with each other, the entities comprising at least a first entity and a second entity, each digital certificate comprising a corresponding linkage value linkable to linkage values of one or more other digital certificates to define one or more groups of digital certificates, the method comprising performing the following operations to generate the digital certificates:

sending by the second entity, to the first entity, encrypted second pre-linkage values which are not decryptable by the first entity;

for each digital certificate:

receiving, by the second entity from the first entity, a certificate generation request comprising an encrypted combined value obtained by the first entity combining a selected first pre-linkage value with a selected second pre-linkage value, wherein at least one of first pre-linkage value and the second pre-linkage value is encrypted using homomorphic encryption, the first and second pre-linkage values being selected by the first entity, the second entity not knowing which of the first and second pre-linkage values were selected for the encrypted combined value, the encrypted combined value not being decryptable by the first entity;

in response to the certificate generation request:

decrypting, by the second entity, the corresponding encrypted combined value; and creating, by the second entity, the corresponding digital certificate with a linkage value obtained from the corresponding combined value;

wherein the second entity performs verification operations on consecutive groups of n certificate generation requests received from the first entity, where n is greater than one, wherein for each group of n certificate generation requests, performing the verification operation comprises:

(a) receiving from the first entity a list of the encrypted second pre-linkage values for the group without an indication which of the encrypted second pre-linkage values corresponds to any given certificate generation request;

(b) receiving from the first entity an output of a computation performed on the first pre-linkage values for the group, the output not disclosing which of the first pre-linkage values corresponds to any given certificate generation request; and matching the combined values for the group with the values received in (a) and (b).

13. The method of claim 12 wherein:

the digital certificates are generated in response to one or more user requests, each user request being a request to generate a batch of digital certificates for a respective user for a plurality of time periods, each batch including, for each time period, a plurality of digital certificates valid in the time period;

wherein each digital certificate is not trackable to the respective user without secret information available to the first entity;

wherein the second entity does not receive the secret information m generating the certificates;

wherein the method further comprises, for each digital certificate generated by the second entity, the second entity generating and sending a message to the first entity, the message comprising the digital certificate encrypted by the second entity, wherein each encrypted digital certificate is not decryptable by the first entity but is decryptable by the respective user upon receipt of the message.

14. The method of claim 12, wherein combining a selected first pre-linkage value with a selected second pre-linkage value comprises using a homomorphic property.

15. A tangible non-transitory machine readable storage medium comprising instructions executable by a first entity to perform a method for managing digital certificates by entities operable to perform computing on digital values and to communicate with each other, each digital certificate comprising a corresponding linkage value linkable to linkage values of one or more other digital certificates to define one or more groups of digital certificates, the method comprising performing the following operations to generate the digital certificates:

generating, by the first entity, first pre-linkage values;

receiving, by the first entity, encrypted second pre-linkage values from a second entity, wherein at least one of first pre-linkage values and the second pre-linkage values are encrypted using homomorphic encryption, wherein each encrypted second pre-linkage value is not decryptable by the first entity;

for each digital certificate:

selecting, by the first entity, a first pre-linkage value and an encrypted second pre-linkage value;

combining, by the first entity, the selected first pre-linkage value with the selected encrypted second pre-linkage value without decrypting the second pre-linkage value, to obtain an encrypted combined value, the encrypted combined value being decryptable by the second entity but not the first entity; and sending, by the first entity to the second entity, a certificate generation request comprising the encrypted combined value;

wherein the second entity performs verification operations on consecutive groups of n certificate generation requests received from the first entity, where n is greater than one, wherein for each group of n certificate generation requests, performing the verification operation comprises:

(a) receiving from the first entity a list of the encrypted second pre-linkage values for the group without an indication which of the encrypted second pre-linkage values corresponds to any given certificate generation request;
(b) receiving from the first entity an output of a computation performed on the first pre-linkage values for the group, the output not disclosing which of the first pre-linkage values corresponds to any given certificate generation request; and
(c) matching the combined values for the group with the values received in (a) and (b).

16. A first entity comprising tangible non-transitory machine readable storage medium comprising instructions executable by a first entity to perform a method for managing digital certificates by entities operable to perform computing on digital values and to communicate with each other, each digital certificate comprising a corresponding linkage value linkable to linkage values of one or more other digital certificates to define one or more groups of digital certificates, the method comprising performing the following operations to generate the digital certificates:
generating, by the first entity, first pre-linkage values;
receiving, by the first entity, encrypted second pre-linkage values from a second entity, wherein at least one of first pre-linkage values and the second pre-linkage values are encrypted using homomorphic encryption, wherein each encrypted second pre-linkage value is not decryptable by the first entity;
for each digital certificate:
selecting, by the first entity, a first pre-linkage value and an encrypted second pre-linkage value;
combining, by the first entity, the selected first pre-linkage value with the selected encrypted second pre-linkage value without decrypting the second pre-linkage value, to obtain an encrypted combined value, the encrypted combined value being decryptable by the second entity but not the first entity;
sending, by the first entity to the second entity, a certificate generation request comprising the encrypted combined value; and wherein the second entity performs verification operations on consecutive groups of n certificate generation requests received from the first entity, where n is greater than one, wherein for each group of n certificate generation requests, performing the verification operation comprises:
(a) receiving from the first entity a list of the encrypted second pre-linkage values for the group without an indication which of the encrypted second pre-linkage values corresponds to any given certificate generation request;
(b) receiving from the first entity an output of a computation performed on the first pre-linkage values for the group, the output not disclosing which of the first pre-linkage values corresponds to any given certificate generation request;
(c) matching the combined values for the group with the values received in (a) and (b).

17. The first entity of claim 16, wherein the method further comprises performing, by the second entity, operations of:
receiving the certificate generation requests;
for each certificate generation request:
decrypting the corresponding encrypted combined value; and
creating the corresponding digital certificate with a linkage value obtained from the corresponding encrypted combined value.

18. The first entity of claim 16, wherein:
(d) if there is no match in (c), then generating an error report.

19. The first entity of claim 16, wherein in the method, for each combined value, the second entity does not know which second pre-linkage value was selected by the first entity for the combined value.

20. The first entity of claim 16, wherein combining the selected first pre-linkage value with the selected encrypted second pre-linkage value comprises using a homomorphic property.

* * * * *